(12) United States Patent
Kim et al.

(10) Patent No.: US 12,058,100 B2
(45) Date of Patent: Aug. 6, 2024

(54) ELECTRONIC DEVICE FOR PERFORMING EDGE COMPUTING SERVICE AND OPERATION METHOD OF ELECTRONIC DEVICE

(71) Applicant: Samsung Electronics Co., Ltd., Suwon-si (KR)

(72) Inventors: Jinhyoung Kim, Suwon-si (KR); Wonbo Lee, Suwon-si (KR); Youngwook Kim, Suwon-si (KR); Hongshik Kim, Suwon-si (KR); Ansik Shin, Suwon-si (KR); Sangcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/320,688

(22) Filed: May 19, 2023

(65) Prior Publication Data
US 2023/0300107 A1   Sep. 21, 2023

Related U.S. Application Data

(63) Continuation of application No. PCT/KR2021/012892, filed on Sep. 17, 2021.

(30) Foreign Application Priority Data

Nov. 24, 2020   (KR) .................. 10-2020-0158652

(51) Int. Cl.
*G06F 15/16*   (2006.01)
*H04L 61/4511*   (2022.01)
*H04L 61/58*   (2022.01)

(52) U.S. Cl.
CPC .......... *H04L 61/4511* (2022.05); *H04L 61/58* (2022.05)

(58) Field of Classification Search
CPC ................ H04L 61/4511; H04L 61/58
(Continued)

(56) References Cited

U.S. PATENT DOCUMENTS 8,245,304 B1 * 8/2012 Chen ................ H04L 63/1483
705/347
9,106,700 B2 * 8/2015 Archbold .......... H04L 61/4511
(Continued)

FOREIGN PATENT DOCUMENTS

| CN | 108040085 A | 5/2018 |
| CN | 109788078 A | 5/2019 |

(Continued)

OTHER PUBLICATIONS

International Search Report dated Dec. 28, 2021, issued in International Application No. PCT/KR2021/012892.
(Continued)

*Primary Examiner* — Alicia Baturay
(74) *Attorney, Agent, or Firm* — Jefferson IP Law, LLP

(57) ABSTRACT

An electronic device and an operation method of an electronic device are provided. The electronic device includes a memory for storing multiple applications including a first application, an edge enabler client (EPC), and multiple domain name system (DNS) caches allocated to each of at least some applications of the multiple applications and/or mapping data obtained by mapping identification information of the at least some applications to the multiple DNS caches; a communication circuit used for a communication connection of an edge service provision server and/or an edge network management server through a base station; and a processor configured to receive, from the first application, an access request for the edge service provision server that the first application desires to access; identify whether a DNS cache corresponding to the first application
(Continued)

exits in the multiple DNS caches based on the mapping data and identification information of the first application, acquire an internet protocol (IP) address corresponding to a domain address included in the access request in case that the DNS cache corresponding to the first application exists, and access the edge service provision server based on the acquired IP address and perform the service.

20 Claims, 11 Drawing Sheets

(58) Field of Classification Search
USPC .......................................................... 709/203
See application file for complete search history.

(56) References Cited

U.S. PATENT DOCUMENTS

| | | | |
|---|---|---|---|
| 9,130,970 | B2 | 9/2015 | Carney et al. |
| 9,231,903 | B2 | 1/2016 | Seastrom et al. |
| 9,621,399 | B1 | 4/2017 | Parakh et al. |
| 10,708,716 | B2 | 7/2020 | Stammers et al. |
| 10,869,184 | B2 | 12/2020 | Palaniappan et al. |
| 2012/0297478 | A1* | 11/2012 | Martin ................ H04L 61/4511 726/22 |
| 2012/0324094 | A1 | 12/2012 | Wyatt et al. |
| 2014/0082172 | A1 | 3/2014 | Chueh et al. |
| 2020/0287867 | A1 | 9/2020 | Knecht et al. |
| 2020/0329007 | A1 | 10/2020 | Lee et al. |
| 2020/0389531 | A1 | 12/2020 | Lee et al. |
| 2022/0166776 | A1 | 5/2022 | Lee et al. |
| 2022/0201597 | A1 | 6/2022 | Kim et al. |
| 2024/0007314 | A1* | 1/2024 | Yao ..................... H04L 12/1435 |

FOREIGN PATENT DOCUMENTS

| | | |
|---|---|---|
| CN | 111615128 A | 9/2020 |
| EP | 3 731 495 A1 | 10/2020 |
| JP | 2019-041266 A | 3/2019 |
| JP | 2019-121975 A | 7/2019 |
| JP | 2020-080472 A | 5/2020 |
| KR | 10-2020-0007634 A | 1/2020 |
| KR | 10-2020-0007754 A | 1/2020 |
| KR | 10-2020-0114957 A | 10/2020 |
| KR | 10-2020-0115359 A | 10/2020 |
| KR | 10-2020-0119945 A | 10/2020 |
| WO | 2017/100640 A1 | 6/2017 |

OTHER PUBLICATIONS

Suzuki Masaki et al., Enhanced DNS Support towards Distributed MEC Environment, ETSI White Paper No. 39, Sep. 1, 2020, pp. 1-25, XP093141085.

European Search Report dated Mar. 25, 2024, issued in European Application No. 21898310.4.

* cited by examiner

ELECTRONIC DEVICE FOR PERFORMING EDGE COMPUTING SERVICE AND OPERATION METHOD OF ELECTRONIC DEVICE

CROSS-REFERENCE TO RELATED APPLICATION(S)

This application is a continuation application, claiming priority under § 365(c), of an International application No. PCT/KR2021/012892, filed on Sep. 17, 2021, which is based on and claims the benefit of a Korean patent application number 10-2020-0158652, filed on Nov. 24, 2020, in the Korean Intellectual Property Office, the disclosure of which is incorporated by reference herein in its entirety.

BACKGROUND

1. Field

The disclosure relates to an electronic device and a method of operating the electronic device. More particularly, the disclosure relates to an electronic device for performing an edge computing service.

2. Description of Related Art

As various electronic devices such as smartphones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic needs that are increasing after commercialization of a fourth generation (4G) communication system, efforts to develop a fifth generation (5G) communication system have been made. For this reason, the 5G communication system is called a beyond 4G network communication system or a post-long term evolution (LTE) system. The 5G communication system considers implementation in a higher frequency band (for example, a band of 60 GHz) other than a band of sixth generation (6G) or lower in order to meet a high data transmission rate. In the 5G communication system, technologies such as beamforming, massive multiple-input multiple-output (MIMO), full dimensional MIMO (FD-MIMO), array antenna, analog beam-forming, and large scale antenna are being discussed.

In the 5G communication system, various technologies are being proposed and implemented to realize a reduction in a transmission time or a reduction in a delay time. Among the implemented technologies, an edge service means a technology for implementing an edge network system in an area adjacent to a base station (BS) and providing various services through the edge network system implemented in the area adjacent to the BS to an electronic device connected to the BS. The edge service may reduce a distance between an electronic device of a user and a network.

The above information is presented as background information only to assist with an understanding of the disclosure. No determination has been made, and no assertion is made, as to whether any of the above might be applicable as prior art with regard to the disclosure.

SUMMARY

An electronic device capable of performing an edge service may include a domain name system (DNS) cache in order to access an edge service provision server which provides the edge service. The DNS cache may be an element which stores a domain address and an internet protocol (IP) address for access to a server. The electronic device may identify an IP address corresponding to a domain address transmitted by an application, which performs the edge service, with reference to the DNS cache and access a server, which provides the edge service, on the basis of the identified IP address.

The DNS cache may be an element which various applications installed in the electronic device can access. When an application, which cannot access the edge service provision server, transmits the IP address corresponding to the domain address to the DNS server, the DNS server, which does not store IP addresses of elements of the edge network, may not provide the IP address corresponding to the domain address. The DNS cache may store information indicating that access to the server corresponding to the domain address is impossible for a predetermined time, in which case the access to the edge service provision server may be impossible until the information stored in the DNS cache is deleted after the predetermined time.

Aspects of the disclosure are to address at least the above-mentioned problems and/or disadvantages and to provide at least the advantages described below. Accordingly, an aspect of the disclosure is to provide an electronic device for performing an edge computing service.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store a plurality of applications comprising a first application, an edge enabler client (EEC), and a plurality of DNS caches allocated to at least some applications of the plurality of applications, and/or mapping data in which identification information of the at least some applications and the plurality of DNS caches are mapped, a communication circuit used for a communication connection of an edge network management server and/or an edge service provision server through a base station (BS), and a processor configured to receive, from the first application, an access request for the edge service provision server that the first application desires to access, identify whether a DNS cache corresponding to the first application exists in the plurality of DNS caches, based on identification information of the first application and the mapping data, acquire an IP address corresponding to a domain address included in the access request, in case that the DNS cache corresponding to the first application exists in the plurality of DNS caches, and access the edge service provision server, based on the acquired IP address to perform a service.

In accordance with another aspect of the disclosure, a method of operating an electronic device is provided. The method includes receiving, from a first application allowed to use an edge service, an access request for an edge service provision server that the first application desires to access, identifying whether a DNS cache corresponding to the first application exists in a plurality of DNS caches, based on mapping data, in which each of identification information of applications matches the plurality of DNS caches, and identification information of the first application, acquiring an IP address corresponding to a domain address included in the access request, in case that the DNS cache corresponding to the first application exists in the plurality of DNS caches, and accessing the edge service provision server, based on the acquired IP address to perform a service.

An electronic device and a method of operating the electronic device according to various embodiments of the disclosure can be implemented to use different DNS caches for respective applications installed in the electronic device or applications included in access information of an edge service provision server. Accordingly, the electronic device and the method of operating the electronic device can prevent failure of access to the edge service provision server by an application, which can use the edge service, due to attempt to access the edge service provision server by an application which cannot use the edge service.

In response to a change in access information of the edge service provision server, the electronic device and the method of operating the electronic device can update a DNS cache on the basis of the changed access information. Accordingly, the electronic device and the method of operating the electronic device can prevent access to the edge service provision server using an IP address stored in the DNS cache before the update and smoothly implement access to the changed edge service provision server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
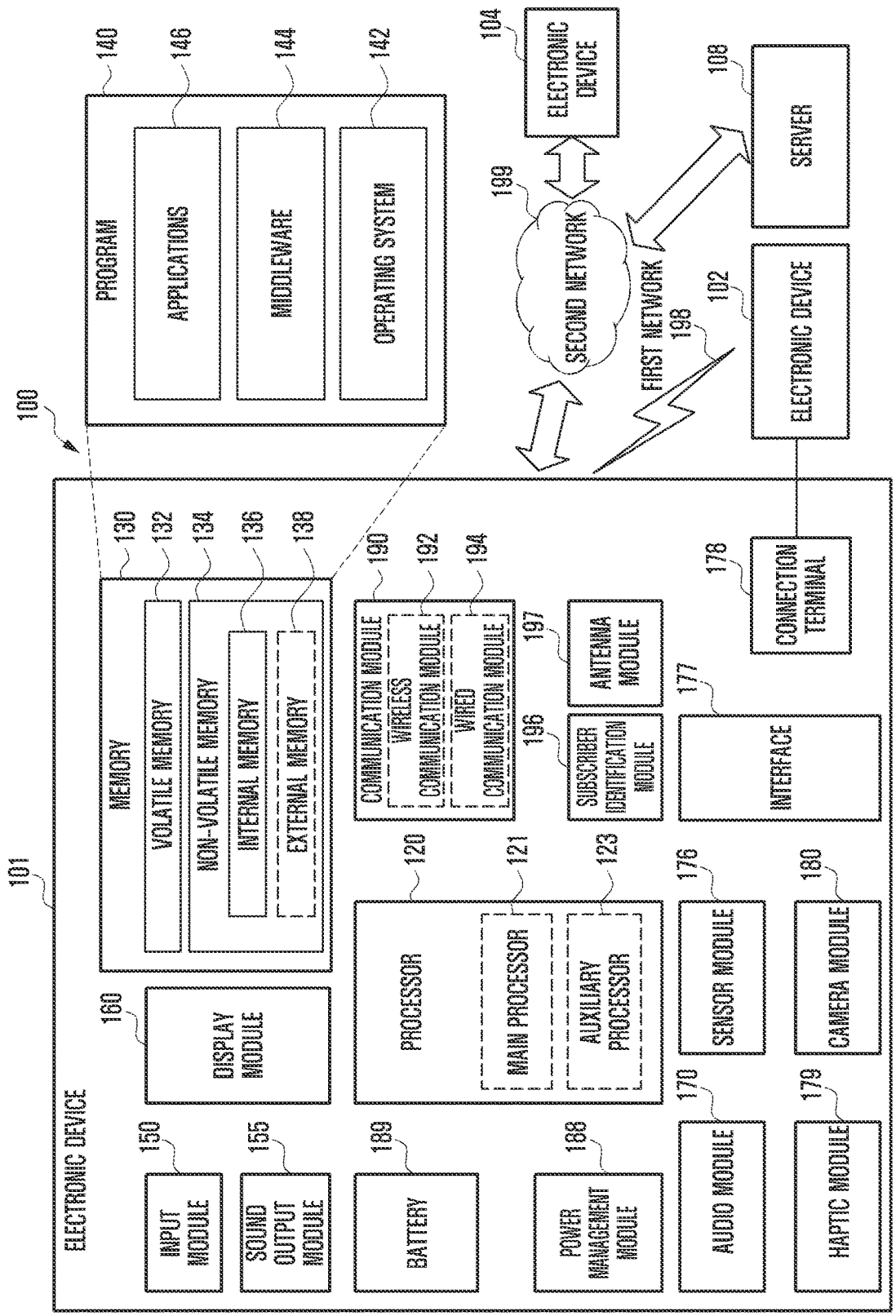
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
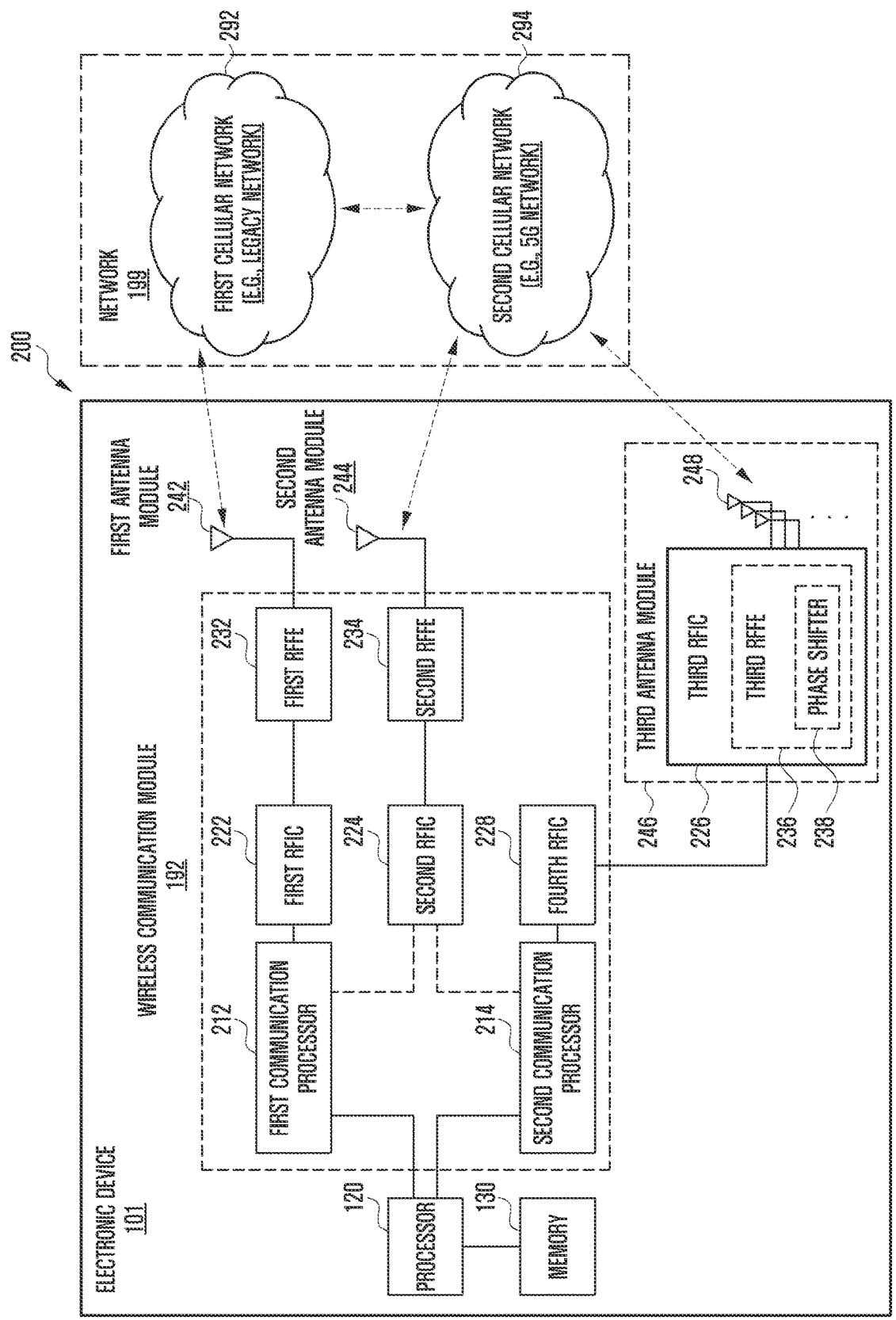
FIG. 2 is a block diagram of an electronic device according to an embodiment of the disclosure.

FIG. 2 is a block diagram illustrating an electronic device in a network environment 200 including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
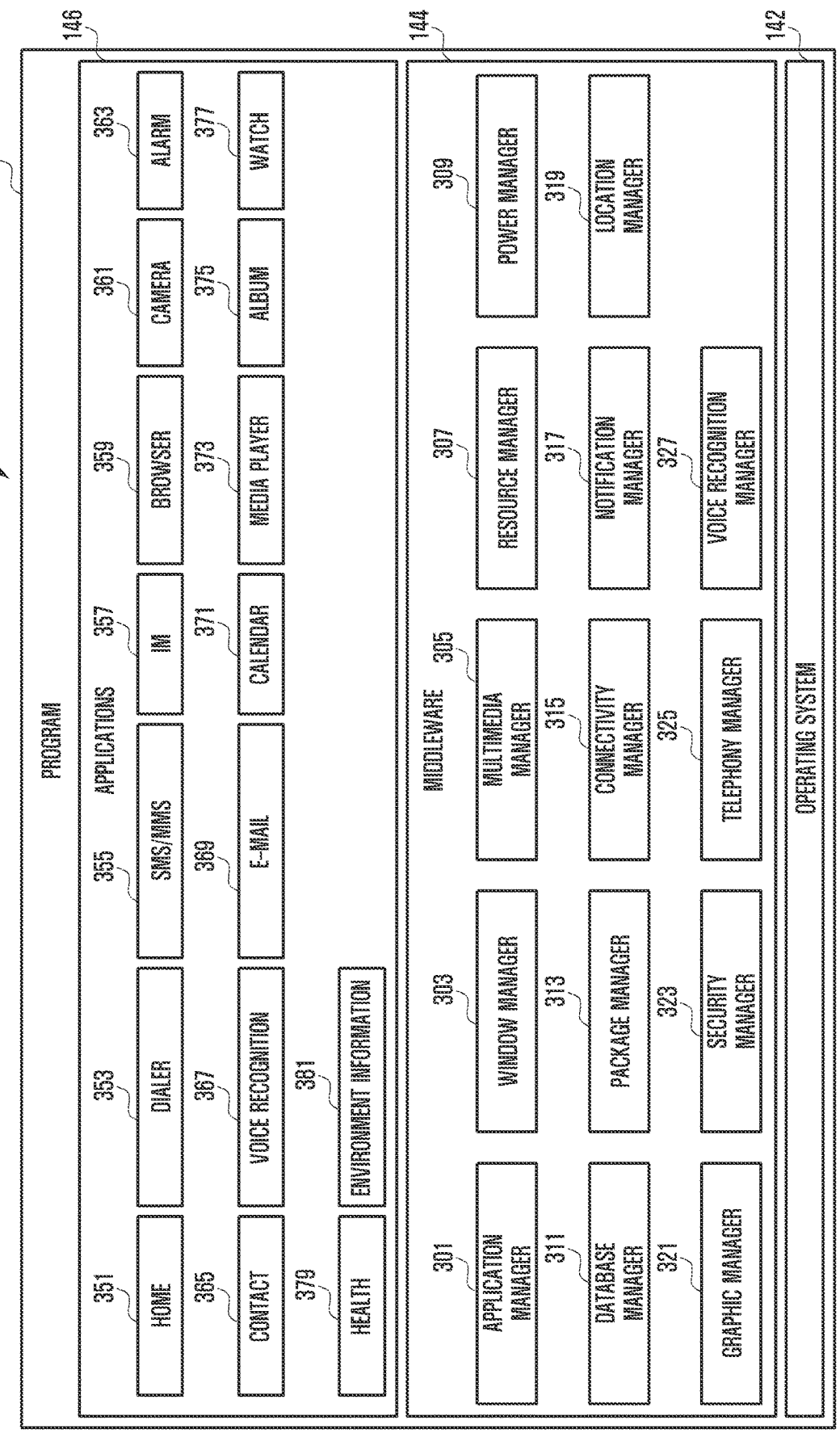
FIG. 3 is a block diagram illustrating a program according to an embodiment of the disclosure.

FIG. 3 is a block diagram 300 illustrating the program 140 according to an embodiment of the disclosure.

Referring to FIG. 3, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™ or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 4:
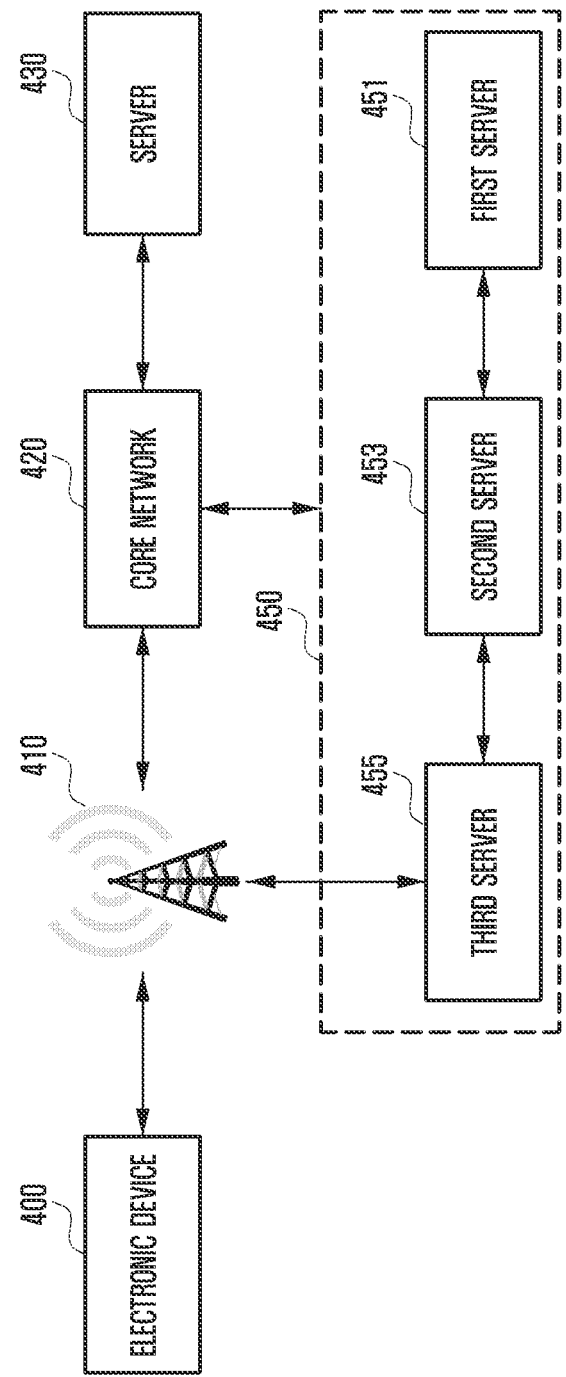
FIG. 4 is a block diagram illustrating a network system according to an embodiment of the disclosure.

FIG. 4 is a block diagram illustrating a network system according to an embodiment of the disclosure.

FIG. 4 shows a network system in which an electronic device 400 uses an edge network system.

Referring to FIG. 4, according to various embodiments of the disclosure, the network system may include the electronic device 400 (for example, the electronic device 101 of FIG. 1), a base station (BS) 410, a core network 420, a server 430, and/or an edge network system 450.

The electronic device 400 according to various embodiments of the disclosure may receive data provided by the server 430 or transmit data to the server through the BS 410 and the core network 420. The server 430 may be a server existing outside a network operated by a cellular communication operator (for example, a network including the BS 410 and the core network 420). According to an embodiment, a subject to operate the server 430 may be an operator different from the cellular communication operator.

In various embodiments of the disclosure, the electronic device 400 may transmit or receive control data or user data to or from the BS 410 while performing cellular communication. The cellular communication may be one communication scheme among various cellular communication schemes which can be supported by the electronic device 400. For example, the cellular communication may be one scheme among cellular communication through a first network (for example, the first network 198 of FIG. 1) (for example, long-term evolution (LTE), LTE-advanced (LTE-A), or LTE advanced pro (LTE-A-pro)), or cellular communication through a second network (for example, the second network 199 of FIG. 1) (for example, 5G on below 6 GHz or 5G on above 6 GHz).

According to various embodiments of the disclosure, the BS 410 may be wirelessly connected to the electronic device 400 and wiredly or wirelessly connected to the core network 420 and/or the edge network 450, so as to configure a path for data transmission or reception between the electronic device 400 and the core network 420 and/or the edge network 450. The BS 410 may transmit control data or user data transmitted by the core network 420 and/or the edge network 450 to the electronic device 400. The BS 410 may transmit control data or user data transmitted by the electronic device 400 to the core network 420 and/or the edge network 450. The control data may be data for controlling various operations by the electronic device 400 through cellular communication. The user data may be IP data transmitted by the electronic device 400 through cellular communication. For example, the BS 410 may be defined as an evolved Node B (eNB) (or eNodeB) in a 4th-generation mobile communication scheme and a next-generation node B (gNB) (or gNodeB) in a 5th-generation mobile communication scheme.

According to various embodiments of the disclosure, the core network 420 may perform various functions (for example, call connection, IP data processing, authentication of the electronic device 400, processing of charging a cellular communication service used by the electronic device 400, management of mobility of the electronic device 400, or connection of the electronic device 400 to an external network) used by the electronic device 400. The core network 420 may be defined as an evolved packet core (EPC) in a 4th-generation mobile communication scheme and a 5G core (5GC) in a 5th-generation mobile communication scheme.

According to various embodiments of the disclosure, the core network 420 supporting the 5th-generation mobile communication may support more various functions (for example, edge computing) than the core network supporting the $4^{th}$-generation mobile communication. The edge computing may be a technology for performing various services through the edge network system 450 implemented physically close to the electronic device 400 (for example, the location physically close to the BS 410, the inside of the BS 410, the location close to the core network 420 close to the BS 410, the inside of the core network 420, or the location close to the core network 420 and the server 430) in order to realize a fast communication speed or a low latency time. The edge network system 450 may be implemented at the location physically close to the electronic device 400 compared to the server 430, and thus data communication through the edge network system 450 may realize a faster communication speed and/or a lower latency time than data communication through the core network 420. For example, the edge network system 450 may be directly connected to the core network 420, located physically close to the core network 420, or located inside the core network 420.

According to various embodiments of the disclosure, a first server 451 may be a sever that provides information on at least one second server 453 to which the electronic device 400 can be connected. For example, information on the second server 453 may include access information of the second server 453 (for example, an IP address of the second server 453, access address information of the second server 453 including a domain name of the second server 453 and/or a uniform resource locator (URL) of the second server 453, and an identifier of the second server 453). The first server 451 may be an element which is the same as or is similar to an edge data network configuration server (ECS) defined in TS 23.558.

According to various embodiments of the disclosure, the second server 453 may be a server which is connected to a third server 455 and manages various operations of the third server 455. The second server 453 may receive capability information of the third server 455 (for example, available resources of the third server 455 (for example, memory capacity or bandwidth) from the third server 455. The second server 453 may transmit information on at least one third server 455 connected to the second server 453 in response to a request from the electronic device 400. The second server 453 may be an element that is the same as or is similar to an edge enabler server (EES) defined in TS 23.558.

Figure 5:
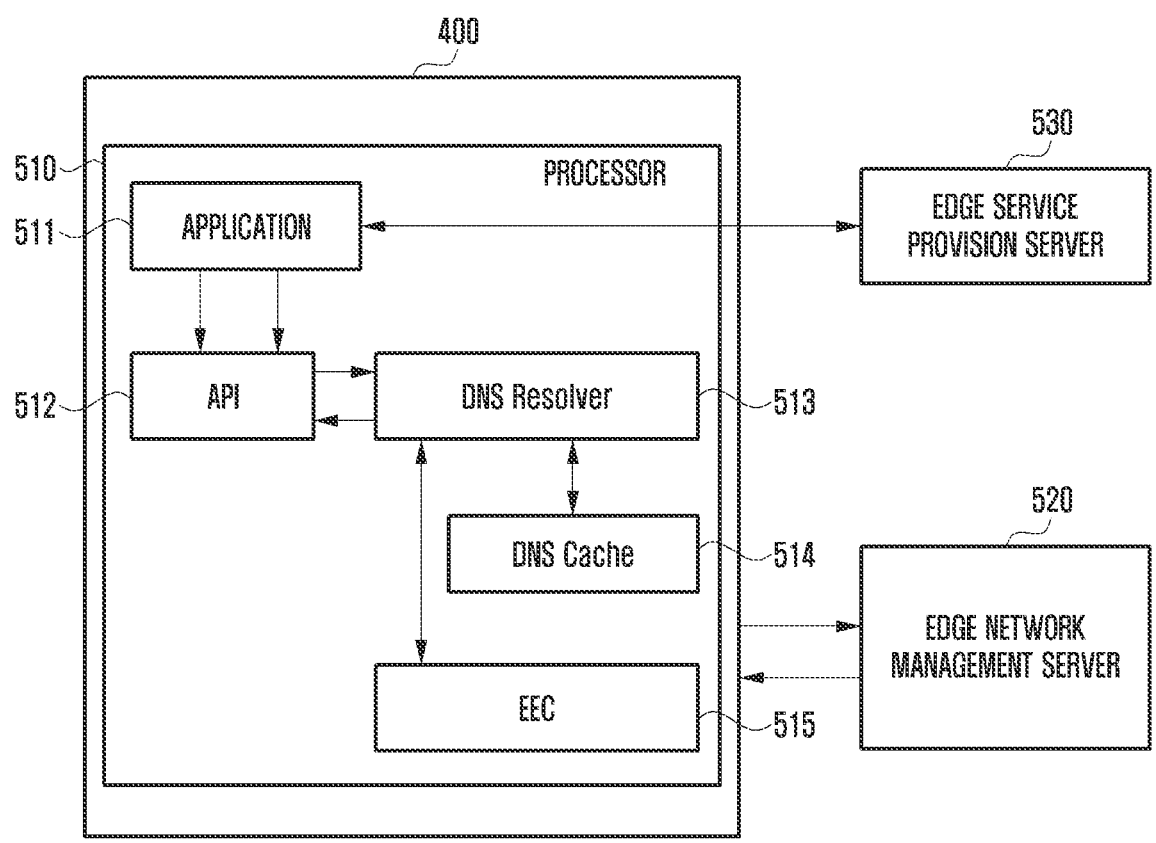
FIG. 5 illustrates an embodiment in which the electronic device acquires an IP address corresponding to a domain name according to an embodiment of the disclosure.

According to various embodiments of the disclosure, the third server 455 may be a server that provides an edge computing service which can be used by an application installed in the electronic device 400. The third server 455 may provide application data related to the edge computing service to the application. The third server 455 may be an element that is the same as or is similar to an edge application server (EAS) defined in TS 23.558. Although FIG. 5 illustrates one third server 455, a plurality of third servers 455 may be deployed according to a provided service. At least one third server 455 may be deployed within the mobile communication network to provide the edge service to an adjacent user equipment (UE).

According to various embodiments of the disclosure, for the connection of the edge network system 450, the electronic device 400 may transmit a signal making a request for accessing the first server 451 to the core network 420. The core network 420 may transmit access information of the first server 451 to the electronic device 400 through various procedures (for example, the authentication operation of the electronic device 400).

In various embodiments of the disclosure, it is illustrated that all of the first server 451, the second server 453, and the third server 455 included in the edge network system 450 are deployed adjacent to the BS 410 for convenience of description, but the disclosure is not limited to and various deployments may be possible. For example, the first server 451 and the second server 453 may be deployed while being connected or adjacent to the core network (for example, the core network 420 of FIG. 4), and the third server 455 may be deployed at a location close to the electronic device 400 (for example, while being connected or adjacent to the BS 410). In another example, the first server 451 and the second server 453 may be deployed outside (for example, the Internet network) the mobile communication network (for example, the network including the BS 410 and the core network 420) operated by the cellular communication operator, and the third server 455 may be deployed at the location close to the electronic device 400. Alternatively, the first server 451 and the second server 453 may be implemented as an integrated single entity. It may be easily understood by those skilled in the art that elements included in the edge network system 450 may have various deployment forms if the edge network system 450 according to various embodiments includes at least one third server 455 which is deployed closer to the electronic device 400 than the external server 430 and can provide the edge service.

Various embodiments of the connection operation between the electronic device 400 and the edge network system 450 is described below with reference to FIG. 5.

FIG. 5 illustrates an embodiment in which the electronic device acquires an IP address corresponding to a domain name according to an embodiment of the disclosure.

According to various embodiments of the disclosure, an edge network system (for example, the edge network system 450 of FIG. 4) may include an edge network management server 520 (for example, the first server 451 or the second server 453 of FIG. 4) and/or an edge service provision server 530 (for example, the third server 455 of FIG. 4).

According to various embodiments of the disclosure, the edge service provision server 530 may be a server which provides an edge computing service which can be used by an application 511 installed in the electronic device 400. The edge service provision server 530 may provide application data related to the edge computing service to the application 511. The edge service provision server 530 may be an element that is the same as or is similar to an edge application server (EAS) defined in TS 23.558.

According to various embodiments of the disclosure, the edge network management server 520 may be a server which is connected to the edge service provision server 530 and manages various operations of the edge service provision server 530. The edge network management server 520 may receive capability information of the edge service provision server 530 (for example, available resources of the edge service provision server 530 (memory capacity or bandwidth) from the edge service provision server 530. The edge network management server 520 may transmit information on at least one edge service provision server 530 connected to the edge network management server 520 in response to a request from the electronic device 400. The edge network management server 520 may be an element that is the same as or is similar to an edge enabler server (EES) defined in TS 23.558. Alternatively, the edge network management server 520 may be an element including both the edge enabler server and the edge data network configuration server (ECS).

According to various embodiments of the disclosure, the electronic device 400 may include a processor 510 (for example, the processor 120 of FIG. 1) and a memory (for example, the memory 130 of FIG. 1). The memory 130 may store various program modules which can be executed in the processor 120. The memory 130 may store an application 511 (for example, the application 146 of FIG. 1) capable of using a service through the edge network, various elements (for example, an edge enabler client (EEC) 515) for supporting edge computing, and/or various elements (for example, an application programming interface (API) 512, a DNS resolver 513, and a DNS cache 514) for supporting an IP address which the application 511 can access.

According to various embodiments of the disclosure, the processor 510 may load and execute (or operate) various program modules (for example, the application 511, the API 512, the DNS resolver 513, the DNS cache 514, and/or the EEC 515) stored in the memory 130. The EEC 515 may be implemented in an application layer (for example, the application 146 of FIG. 1), middleware (for example, the middleware 144 of FIG. 1), and/or an operating system (for example, the operating system 142 of FIG. 1).

According to various embodiments of the disclosure, the EEC 515 may identify the application 511 capable of using the edge computing service among various applications being executed (or operated) in the electronic device 400 and perform various operations for configuring the application 511 to transmit or receive data of the application 511 to or from the edge service provision server 530.

The EEC 515 may receive access information of elements of the edge network system 450 for allowing the application 511 to exchange application data through the edge network system 450 from the edge network system 450 and control the connection between the edge network system 450 and the electronic device 400 on the basis of the access information. Hereinafter, a detailed embodiment for the connection between the EEC 515 and the edge service provision server 530 is described.

According to various embodiments of the disclosure, the EEC 515 may perform an operation of making the connection with the first server 451 on the basis of access information of a first server (for example, the first server 451 of FIG. 4) received from a core network (for example, the core network 420 of FIG. 4). In another embodiment, the EEC 515 may perform an operation of making the connection with the first server 451 on the basis of access information of the first server 451 stored in the electronic device (for example, the memory 130 and/or a SIM card (for example, the subscriber identification module 196 of FIG. 1). The EEC 515 may transmit identification information of the electronic device 400 (for example, an international mobile subscriber identify (IMSI) and/or a generic public subscription identifier (GPSI) of the electronic device 400) to the first server 451, and the first server 451 may authenticate the electronic device 400 on the basis of the identification information of the electronic device 400.

According to various embodiments of the disclosure, after the connection with the first server 451 is completed, the EEC 515 may perform a provisioning procedure for the edge service. The provisioning procedure may include an operation of transmitting a signal making a request for access information of the edge network management server 520 to the first server 451. The first server 451 may transmit access information of the edge network management server 520 (for example, at least one of an identifier of the edge network management server 520, uniform resource identifier (URI) information of the edge network management server 520, domain information of the edge network management server 520, IP address information of the edge network management server 520, access point name (APN) information corresponding to a dedicated public data network (PDN) or a packet data unit (PDU) when the dedicated PDN of the edge network system 450 or a PDU session exists, and/or data network name (DNN) information and/or information (for example, a token) used for verification for the valid connection of the edge network management server 520) to the electronic device 400.

According to various embodiments of the disclosure, the access information of the edge network management server 520 may be the same as or may be similar to an EES list defined in TS 23.558. For example, the access information of the edge network management server 520 may be implemented as shown in Table 1 below and transmitted to the EEC 515. The access information of the edge network management server 520 may include an identifier of the edge network management server 520 and/or access address information of the edge network management server 520 (for example, URI information of the edge network management server 520, domain information of the edge network management server 520, IP address information of the edge network management server 520, access point name (APN) information corresponding to a dedicated PDN or PDU when the dedicated PDN of the edge network system 500 or a PDU session exists, and/or data network name (DNN) information).

TABLE 1

| Edge network management server identification information | Access address information |
|---|---|
| EES 1 | ees1.edge1.com |
| EES 2 | ees2.edge2.com |

According to various embodiments of the disclosure, the EEC 515 may attempt access to the edge network management server 520 on the basis of access information of the edge network management server 520 (for example, the EES identifier or access address information) received from the first server 451. The edge network management server 520 may identify whether the electronic device 400 is an electronic device having a right to access the edge network management server 520 on the basis of the access information (for example, the token) of the edge network management server 520 transmitted by the EEC 515 and determine whether to allow the access (or connection) of the electronic device 400 on the basis of the identification result. For example, the edge network management server 520 may receive the token and determine whether to allow the electronic device 400 to access (or make the connection to) the edge network management server 520 through an authentication operation through the received token with an authentication server (not shown). In this case, the token may be information which the authentication server (not shown) transmits to the electronic device 400.

According to various embodiments of the disclosure, the EEC 515 may perform an edge service discovery procedure (for example, a procedure of discovering service information which can be executed by edge server(s)) for acquiring information on the edge service provision server 530 which can provide the edge computing service to the application 511. The EEC 515 may transmit an edge service discovery request message making a request for access information of at least one edge service provision server 530 connected to the edge network management server 520 to the edge network management server 520. The edge network management server 520 may transmit an edge service discovery response message including access information of the edge service provision server 530 stored in the edge network management server 520 to the EEC 515.

The access information of the edge service provision server 530 may include an identifier of the edge service provision server 530 (edge application server identification (EASID)), an identifier of the application installed in the electronic device 400 (atomicity, consistency, isolation, durability (ACID)), and/or access address information of the edge service provision server 530 (for example, the IP address of the edge service provision server 530 and the domain address of the edge service provision server 530).

According to various embodiments of the disclosure, the edge service provision server 530 may be a software entity implemented in units of services. For example, a plurality of edge service provision servers 530 may be servers which provide different services as entities implemented in one physical server. In this case, access information of the edge service provision server 530 may include access information of applications that can be executed by the edge service provision server 530 and/or identifiers of applications that are installed in the electronic device 400 and can perform a service using the edge service provision server 530. The identifier of the service which can be provided by the edge service provision server 530 may be an identifier of an application installed in the edge service provision server 530.

According to various embodiments of the disclosure, the access information of the edge service provision server 530 may be the same as or may be similar to an EAS list defined in TS 23.558. Information on the edge service provision server 530 may be implemented as shown in Table 2 below and transmitted to the EEC 515.

TABLE 2

| Identifier of third server | Identifier of application installed in electronic device (ACID) | Access address information |
|---|---|---|
| EAS1 | com.android.app1 | ees1.edge1.com |
| EAS2 | com.android.app2 | 2.2.2.2 |
| EAS3 | com.android.app3 | ees3.edge3.com/3.3.3.3 |

Access information of the edge service provision server 530 included in Table 2 may include an identifier of the edge service provision server 530 and/or an identifier of an application executed by the electronic device 400 (ACID). For example, respective rows (for example, EAS1, EAS2, EAS3, and the like) may refer to identifiers and access information for a first server application and a second server application which can be executed by the edge service provision server 530.

According to various embodiments of the disclosure, the identifier of the edge service provision server 530 is an identifier of a service application executed in the edge service provision server 530 and may be a value distinguished for each service application which can be executed by the edge service provision server 530. When the number of service applications which can be executed by the edge service provision server 530 is plural, the edge service provision server 530 may have identifiers of the plurality of edge service provision servers 530. When the number of service applications which can be executed by the edge service provision server 530 is one, the edge service provision server 530 may have an identifier of the one edge service provision server 530, and the identifier of the edge service provision server 530 may be exchangeable with an identifier of a service application executed by the edge service provision server 530.

According to various embodiments of the disclosure, the EEC 515 may store mapping information of a domain name of the edge service provision server 530 and an IP address of the edge service provision server 530 in the DNS cache 514. The DNS cache 514 is an element which can store the domain name and the IP address of the edge service provision server 530 and may be implemented in the memory 130.

According to various embodiments of the disclosure, the EEC 515 may receive a service connection request using the edge service provision server 530 from the application 511. According to an embodiment, the service connection request transmitted by the application 511 may include a domain address of (fully qualified domain name) of the edge service provision server 530 providing a service which can be used by the application 511. The EEC 515 may identify the domain address of the edge service provision server 530 and identify identification information of the application 511 (for example, the identifier of the application 511). The service connection request transmitted by the application 511 may be transmitted to the DNS resolver 513 through the API 512 corresponding to an interface between the application 511 and the DNS resolver 513.

According to various embodiments of the disclosure, the DNS resolver 513 may receive the service connection request and identify whether an IP address corresponding to the domain address included in the service connection request exists in the DNS cache 514. When the IP Address exists in the DNS cache 514, the DNS resolver 513 may transmit the IP address to the application 511 through the API 512. The application 511 may access the edge service provision server 530 by using the IP address corresponding to the domain name and use the edge service using the edge service provision server 530.

According to various embodiments of the disclosure, the DNS resolver 513 may identify that the IP address corresponding to the domain address included in the service connection request does not exist in the DNS cache 514 and transmit a signal making a request for the IP Address to the EEC 515. The signal making the request for the IP Address may include the domain address. The EEC 515 may identify identification information of the application 511 corresponding to the domain address from an operating system (for example, the operating system 142 of FIG. 3).

According to various embodiments of the disclosure, the EEC 515 may perform an edge service discovery procedure based on the identification information of the application 511. The EEC 515 may receive access information of the edge service provision server 530 from the edge network management server 520. The EEC 515 may search for the edge service provision server 530 which can provide the service available by the application 511 in the access information of the edge service provision server 530.

According to various embodiments of the disclosure, the EEC 515 may identify an application identifier (for example, com.android.app1) that matches an application identifier (for example, com.android.app1) to be used by the application 511 among application identifiers (for example, com.android.app1 and com.android.app2) of the edge service provision server 530 and transmit a domain name (for example, app1.edge.com) or an IP address (for example, 3.3.3.1) of the edge service provision server 530 corresponding to the identified application identifier (for example, com.android.app1) to the DNS resolver 513. The DNS resolver 513 may update the DNS cache 514 by using the received domain name or IP Address and transmit the IP Address to the application 511 through the updated DNS cache 514. The application 511 may make the connection with the edge service provision server 530 on the basis of the received domain name or IP address of the edge service provision server 530 and use the service using the edge service provision server 530.

According to various embodiments of the disclosure, the DNS cache 514 may store an IP address corresponding to a domain name of a specific server (for example, the edge service provision server 530) and time to live (TTL). TTL may be information indicating a valid time of the IP address. For example, the IP address corresponding to the domain name of the specific server may be valid by TTL from a time at which the IP address is received. The DNS resolver 513 may determine validity of the IP address stored in the DNS cache 514 on the basis of TTL in response to a service address request from the application 511. When the IP address is valid, the DNS resolver 513 may not transmit a signal making a request for the IP address to the EEC 515. The IP address stored in the DNS cache 514 may not be changed during TTL.

Although FIG. 5 illustrates that the processor 510 and/or the application 511 are directly connected to the edge service provision server 530 and/or the edge network management server 520, the processor 510 and/or the application 511 may exchange data with the edge network system 500 through elements (for example, the wireless communication module 192 of FIG. 1) for communication of the electronic device 101.

Referring to FIG. 5, the DNS cache 514 may an element which can be used by all of various applications. For example, when both the application allowed to use the edge service and the application which is not allowed to use the edge service transmit domain names to the DNS resolver 513, the DNS resolver 513 may transmit IP addresses corresponding to the domain names to the application which can use the edge service and the application which cannot use the edge service.

According to an embodiment, when the application which is not allowed to use the edge service makes a request for access address information of the edge service provision server 530, the DNS resolver 513 may transmit the domain name transmitted by the application to a separate DNS server (for example, a system which is not the edge network system). The access address information of the edge service provision server 530 cannot be acquired by the separate DNS server, and thus the separate DNS server may transmit information indicating that there is no IP address corresponding to the domain address to the DNS resolver 513. The DNS resolver 513 may update the DNS cache 514 to include information indicating that there is no IP address corresponding to the domain address or access is not possible and a valid time (TTL) of the information indicating that there is no IP address or access is not possible. In this case, when the application 511 allowed to use the edge service transmits a signal making a request for access information of the edge service provision server 530 to the DNS resolver 513, the DNS resolver 513 may not transmit the IP address for the valid time, and the application 511 allowed to use the edge service may not access the edge service provision server 530.

According to an embodiment, the edge service provision server 530 of the edge network system 450 may be located in an area physically adjacent to the BS (for example, the BS 410 of FIG. 4). As the electronic device 400 moves, the BS 410 connected to the electronic device 400 may be changed, in which case the edge service provision server 530 to be connected to the electronic device 400 may be changed. As the edge service provision server 530 to be connected to the electronic device 400 is changed, the IP address may also be changed. Alternatively, the edge service provision server 530 to be connected to the electronic device 400 may be changed by a policy of the edge service provision server 530. As the edge service provision server 530 to be connected to the electronic device 400 is changed, the IP address may also be changed. However, the IP address stored in the DNS cache 514 may not be changed for a predetermined time (TTL), and the application 511 allowed to use the edge service may not access the edge service provision server 530.

According to an embodiment, each of the applications allowed to use different edge services should access different edge service provision servers 530. However, when applications allowed to use different edge services make a request for the same domain address to the DNS resolver 513, the DNS resolver 513 may transfer the IP address of the same edge service provision server 530.

Figure 6:
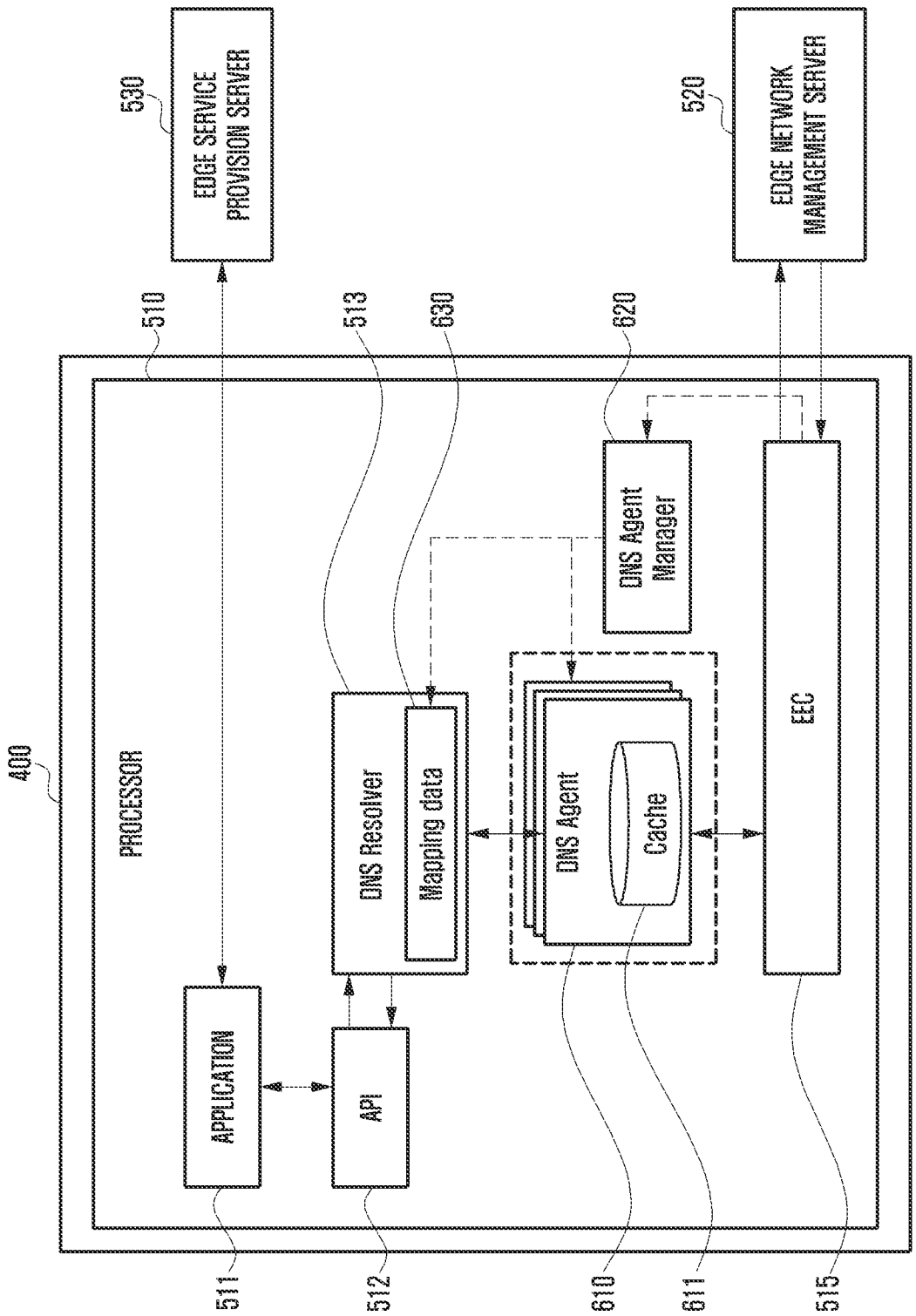
FIG. 6 illustrates an embodiment in which the electronic device acquires an IP address corresponding to a domain name according to an embodiment of the disclosure.

Hereinafter, FIG. 6 illustrates a detailed embodiment in which the electronic device 400 solves the problems by using DNS caches allocated to respective applications allowed to use the edge service.

FIG. 6 illustrates an embodiment in which the electronic device acquires an IP address corresponding to a domain name according to an embodiment of the disclosure.

Among the elements illustrated in FIG. 6, elements which are the same as or are similar to the elements illustrated in FIG. 5 may have the same reference numeral, and duplicated description is omitted.

According to various embodiments of the disclosure, the electronic device 400 may include a processor 510 (for example, the processor 120 of FIG. 1) and a memory (for example, the memory 130 of FIG. 1). The memory 130 may store various program modules which can be executed in the processor 120. The memory 130 may store at least one application 511 (for example, the application 146 of FIG. 1) allowed to use a service through the edge network, various elements (for example, an edge enabler client (EEC) 515) for supporting edge computing, and/or various elements (for example, the API 512 and the DNS resolver 513) for supporting an IP address which the application 511 can access.

According to various embodiments of the disclosure, the memory 130 may store a plurality of DNS caches 611 allocated to at least some applications (for example, the first application 511) among at least one application (for example, the first application 511 and a second application (not shown)), DNS agents 610 for managing the DNS caches 611, and/or a DNS agent manager 620 for managing the DNS agents 610.

According to various embodiments of the disclosure, the processor 510 may load and execute (or operate) various program modules (for example, the application 511, the API 512, the DNS resolver 513, the DNS cache 611, the DNS agent 610, the DNS agent manager 620, and/or the EEC 515) stored in the memory 130. The application 511, the API 512, the DNS resolver 513, the DNS cache 611, the DNS agent 610, the DNS agent manager 620, and/or the EEC 515 may be implemented in an application layer (for example, the first application 146), middleware (for example, the middleware 411 of FIG. 1), and/or an operating system (for example, the operating system 142 of FIG. 1).

According to various embodiments of the disclosure, the DNS agents 610 may manage the DNS caches 611 for storing a domain name and an address of the edge service provision server 530. The DNS agent 610 may receive the domain address transmitted by the DNS resolver 513 and transmit an IP address corresponding to the domain address to the DNS resolver 513. The DNS agent 610 may be generated and managed on the basis of the number of applications allocated to use the edge service. For example, when N applications allowed to use the edge service are installed in the electronic device 400, the electronic device 400 may generate and manage N DNS agents 610. In this case, the electronic device 400 may generate and manage N DNS caches 611. Each of the plurality of DNS agents 610 may include a DNS cache for storing the domain address and the IP address of the edge service provision server 530 which can be used by different applications 511.

According to various embodiments of the disclosure, the DNS agent 610 may be activated when the operating system of the electronic device 400 starts, the first application 511 corresponding to the DNS agent 610 is installed in the electronic device 400, and/or the first application 511 starts. The DNS agent 610 may be deactivated when the first application 511 ends, the first application 511 is deleted from the electronic device 400, and/or the operating system of the electronic device 400 ends.

According to various embodiments of the disclosure, the DNS resolver 513 may receive a request for accessing the edge service provision server 530 transmitted by the first application 511 through the API 512 and select a DNS agent corresponding to the application (for example, the first application 511) transmitting the access request from among the plurality of DNS agents 610. When selecting the DNS agent 610, the DNS resolver 513 may select the DNS agent 610 on the basis of mapping data 630 obtained by mapping the application and the DNS agent 610 (or the DNS cache 611).

According to various embodiments of the disclosure, the mapping data 630 may be data indicating the DNS agents 610 (or the DNS caches 611) allocated to at least one application (for example, the first application 511) allowed to use the edge service among the applications installed in the electronic device 400. The mapping data 630 may be implemented in the form of data obtained by mapping at least one application (for example, the first application 511) allowed to the edge service among the applications installed in the electronic device 400 and the DNS agents 610 (or the DNS caches 611) corresponding to the at least one application.

According to various embodiments of the disclosure, the mapping data 630 may be data indicating the DNS agent 620 allocated to the application included in access information of the edge service provision server 530 received through a discovery procedure between the EEC 515 and the edge network management server 520. The mapping data 630 may be implemented in the form of data obtained by mapping the application included in the access information of the edge service provision server 530 and DNS agents 610 (or DNS caches 611) corresponding to at least one application.

The DNS resolver 513 may select (or determine) the DNS agent 610 or the DNS cache 611 from which the IP address is acquired on the basis of the mapping data, and thus the DNS agent 610 may be referred to by the application (for example, the first application 511) corresponding to the DNS agent 610 but may not be referred to by another application except for the first application 511.

The mapping data 630 may be managed by the DNS agent manager 620, and a detailed embodiment of the mapping data 630 is described below.

According to various embodiments of the disclosure, the DNS resolver 513 may identify an IP address corresponding to a domain address included in the access request by referring to the DNS cache 611 managed by the selected DNS agent and transmit the identified IP address to the first application 511.

According to various embodiments of the disclosure, the DNS resolver 513 may identify whether the first application 511 transmitting the access request including the domain address is an application allowed to use the edge service on the basis of the mapping data 630. The DNS resolver 513 may identify that the first application 511 is the application allowed to use the edge service in response to the identification that identification information of the first application 511 (for example, an identifier of the application or a name of the application) included in the access request is included in the mapping data 630.

According to various embodiments of the disclosure, the DNS resolver 513 may identify that the second application is an application which is not allowed to use the edge service in response to the identification that identification information of the application (for example the second application) (for example, an identifier of the application or a name of the application) included in the access request is not included in the mapping data 630. The DNS resolver 513 may acquire an IP address corresponding to the domain address included in the access request transmitted by the second application with reference to a DNS cache (not shown) which is not the DNS cache 611 managed by the DNS agent 610 in response to the identification that the second application is the application which is not allocated to use the edge service. The other DNS cache may be a cache which all of a plurality of applications including the first application 511 and the second application installed in the electronic device 400 can access.

As described in the embodiment, each of the applications allowed to use the edge service may acquire the IP address with reference to different DNS agents 610 and DNS caches 611. Accordingly, all the applications (for example, the first application 511) allowed to use the edge service may solve the problems which may occur due to the scheme of acquiring the IP address with reference to one DNS cache (for example, the DNS cache 514 of FIG. 5).

According to various embodiments of the disclosure, the DNS resolver 513 may transmit the IP address corresponding to the domain address included in the service connection request of the first application 511 to the DNS agent 610. The DNS agent 610 may identify that there is no IP address in the DNS cache 611 and transmit a signal making a request for the IP address to the EEC 515. The signal making the request for the IP Address may include the domain address.

According to various embodiments of the disclosure, the EEC 515 may use an edge service discovery procedure for acquiring access information of the edge service provision server 530 from the edge network management server 520.

According to an embodiment, the EEC 515 may transmit an edge service discovery request message to the edge network management server 520. The edge service discovery request message may include identification information and/or a domain address of the first application 511. The EEC 515 may receive access information of the edge service provision server 530 from the edge network management server 520. The access information of the edge service provision server 530 may include identification information of the edge service provision server 530, a domain address of the edge service provision server 530, and/or an IP address of the edge service provision server 530.

According to various embodiments of the disclosure, the EEC 515 may identify access information of the edge service provision server 530 and compare the access information with the conventionally stored access information of the edge service provision server 530. The EEC 515 may compare the received access information with the conventionally stored access information and transmit a changed part to the DNS agent manager 620. The DNS agent manager 620 may manage the DNS agent 610 and/or the mapping data 630 on the basis of the changed part.

For example, in response to a change in the access information (for example, a change in the IP address of the edge service provision server 530), the EEC 515 may transmit the changed access information of the edge service provision server 530 to the DNS agent manager 620. The DNS agent manager 620 may identify the changed access information and select the DNS agent 610 related to the changed access information on the basis of the mapping data. The DNS agent manager 620 may update the DNS cache 611 by adding the changed access information to the DNS cache 611 corresponding to the selected DNS agent 610.

In another example, in response to a change in the access information (for example, addition of the edge service provision server 530), the EEC 515 may transmit the changed access information of the edge service provision server 530 to the DNS agent manager 620. The DNS agent manager 620 may identify the changed access information and generate a new DNS agent for access of the added edge service provision server 530 and a DNS cache managed by the new DNS agent. The DNS agent manager 620 may add a domain name and an IP address of the new edge service provision server 530 to the generated DNS cache. The DNS agent manager 620 may update the mapping data 630 by adding the application identification information of the new edge service provision server 530 and the generated DNS agent (or the generated DNS cache) to the mapping data 630.

In another example, in response to a change in the access information (for example, deletion of the edge service provision server 530), the EEC 515 may transmit the changed access information of the edge service provision server 530 to the DNS agent manager 620. The DNS agent manager 620 may identify the changed access information and delete the DNS agent corresponding to the deleted edge service provision server 530 and the DNS cache managed by the DNS agent to be deleted. The DNS agent manager 620 may update the mapping data 630 by deleting the application identification information supported by the deleted edge service provision server 530 and the generated DNS agent (or the generated DNS cache).

According to various embodiments of the disclosure, the EEC 515 may perform a discovery procedure with the edge network management server 520 in response to the installation (or activation), change or deletion of a new application allowed to use the edge service in the electronic device 400, and may update the DNS agent 610, the DNS cache 611, and/or the mapping data 630.

According to various embodiments of the disclosure, the EEC 515 may update the DNS agent 610, the DNS cache 611, and/or the mapping data 630 on the basis of location information of the electronic device 400 transmitted by a sensor (for example, the sensor module 176 of FIG. 1) measuring the location of the electronic device 400. For example, the EEC 515 may identify the location of the electronic device 400 and initialize (or flush) the DNS cache 611 in response to the identification that the electronic device 400 moves by a predetermined distance or longer. The discovery procedure may be performed with the edge network management server 520. The EEC 515 may receive access information of the edge service provisions server 530 acquired during the discovery procedure and control the DNS agent manager 620 to update the DNS agent 610, the DNS cache 611, and/or the mapping data 630 on the basis of the access information of the edge service provision server 530.

According to various embodiments of the disclosure, the EEC 515 may identify whether allowance information related to the location of the edge service provision server 530 is included in the access information of the edge service provision server 530 received through the discovery procedure. When the electronic device 400 exists at a specific location, the allowance information related to the location of the edge service provision server 530 may be information indicating the right to access the edge service provision server 530. The EEC 515may identify the location of the electronic device 400 through the sensor 176 and update the DNS cache 611 on the basis of the identified electronic device 400 and the allowance information related to the location of the edge service provision server 530. For example, the EEC 515 may update the DNS cache 611 to make access to the edge service provision server 530 impossible in response to the identification that the location of the electronic device 400 is a location having no right to access the edge service provision server 530. Updating the DNS cache 611 to make access to the edge service provision server 530 impossible may include adding information indicating that access to an IP address (for example, the IP address of the edge service provision server 530) corresponding to a specific domain name (for example, the domain name of the edge service provision server 530) is impossible to the DNS cache 611. The EEC 515 may update the DNS cache 611 to make access to the edge service provision server 530 possible in response to the identification that the location of the electronic device 400 is a location having the right to access the edge service provision server 530.

Referring to FIG. 6, the electronic device 400 may update the DNS cache 611 corresponding to the changed application or the changed access information in response to the change in the application allowed to use the edge service or the change in the access information of the edge service provision server 530, so as to implement the seamless connection between the electronic device 400 and the edge service provision server 530.

Figure 7:
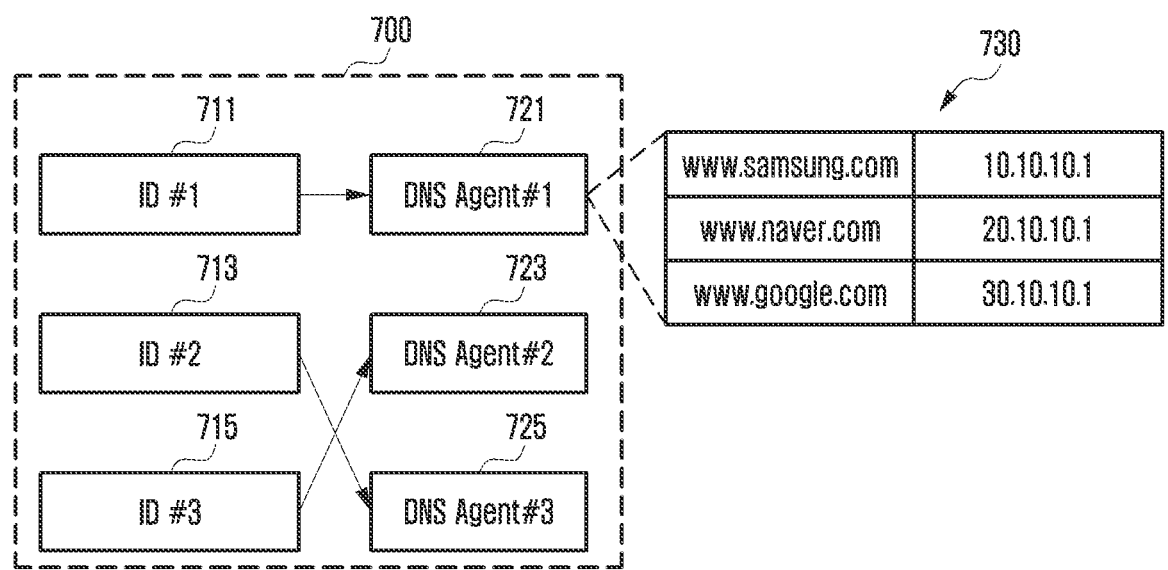
FIG. 7 illustrates mapping data and DNS caches used by the electronic device for acquiring IP addresses according to an embodiment of the disclosure.

FIG. 7 illustrates mapping data and DNS caches used by the electronic device for acquiring IP addresses according to an embodiment of the disclosure.

According to various embodiments of the disclosure, mapping data 700 (for example, the mapping data 630 of FIG. 6) may be data indicating DNS agents 721, 723, and 725 (for example, the DNS agents 610 of FIG. 6) allocated to service applications included in access information of an edge service provision server (for example, the edge service provision server 530 of FIG. 6) received through a discovery procedure between an EEC (For example, the EEC 515 of FIG. 6) and an edge network management server (for example, the edge network management server 520 of FIG. 6).

According to various embodiments of the disclosure, the mapping data 630 may be generated on the basis of information on the service applications included in access information of the edge service provision server 530 received through the discovery procedure between the edge network management server 520 and the electronic device 400. The DNS agent manager 620 may allocate DNS agents 721, 723, and 725 to applications 711, 713, and 715 on the basis of identification information of the service applications included in application information.

The mapping data 700 may be implemented in the form of data obtained by mapping the identification information 711, 713, and 715 of the applications supported by the edge service provision server 530 included in the access information of the edge service provision server 530 and the DNS agents 610 or 721, 723, and 725 (or the DNS caches 611) corresponding to at least one application. The identification information of the applications may include various pieces of information for distinguishing the applications. For example, the identification information of the applications may be one of an identifier of the application, a name of the application, and a package name of the application.

According to various embodiments of the disclosure, the EEC 515 may transmit access information of the edge service provision server 530 received through the discovery procedure between the edge network management server 520 and the electronic device 400 to the DNS agent manager 620. The DNS agent manager 620 may generate or modify the mapping data on the basis of the access information of the edge service provision server 530.

Referring to FIG. 7, the mapping data 700 may be implemented through mapping of the application identification information 711 and the DNS agents 721, 723, and 725 corresponding to the identification information of the applications 711, 713, and 715. A DNS resolver (for example, the DNS resolver 513 of FIG. 6) may identify the identification information of the application transmitting a request for accessing the edge service provision server 530 including a domain address and identify whether the identified identifier exists in the mapping data 700.

For example, when the application transmitting the request for accessing the edge service provision server 530 including the domain address is an application allowed to use the edge service, the DNS resolver 513 may identify identification information of the application transmitting the request for accessing the edge service provision server 530 including the domain address and identify that the identified identifier exists in the mapping data 700.

According to an embodiment, the DNS resolver 513 may be directly connected to the DNS agents 721, 723, and 725 through various communication schemes (for example, an application programming interface (API) or inter-process communication (IPC)). The DNS resolver 513 may transmit the domain address transmitted by the application having identification information 711 to the DNS agent 721 corresponding to the application having identification information 711 through various communication schemes and receive an IP address corresponding to the domain address as shown in 730 from the DNS agent 721. The DNS resolver 513 may transmit the received IP address to the application having identification information 711.

According to another embodiment, the DNS resolver 513 may not be directly connected to the DNS agents 721, 723, and 725. In this case, the DNS resolver 513 may transmit the domain address transmitted by the DNS agent 610 to the DNS agent 721 corresponding to the application having identification information 711 by using another element (iptable or Berkely packet filter (BPF) provided by a kernel end to process a packet) and receive an IP address corresponding to the domain address from the DNS agent 721. The DNS resolver 513 may transmit the received IP address to the application having identification information 711.

In another example, when the application transmitting the request for accessing the edge service provision server 530 including the domain address is an application which is not allowed to use the edge service, the DNS resolver 513 may identify identification information of the application transmitting the request for accessing the edge service provision server 530 including the domain address and identify that the identified identifier does not exist in the mapping data 700. The DNS resolver 513 may acquire the IP address corresponding to the domain address included in the access request transmitted by the application with reference to another DNS cache (not shown) which is not the DNS cache 611 managed by the DNS agent 610. The other DNS cache may be a cache which all of a plurality of applications installed in the electronic device 400 can access.

Figure 8:
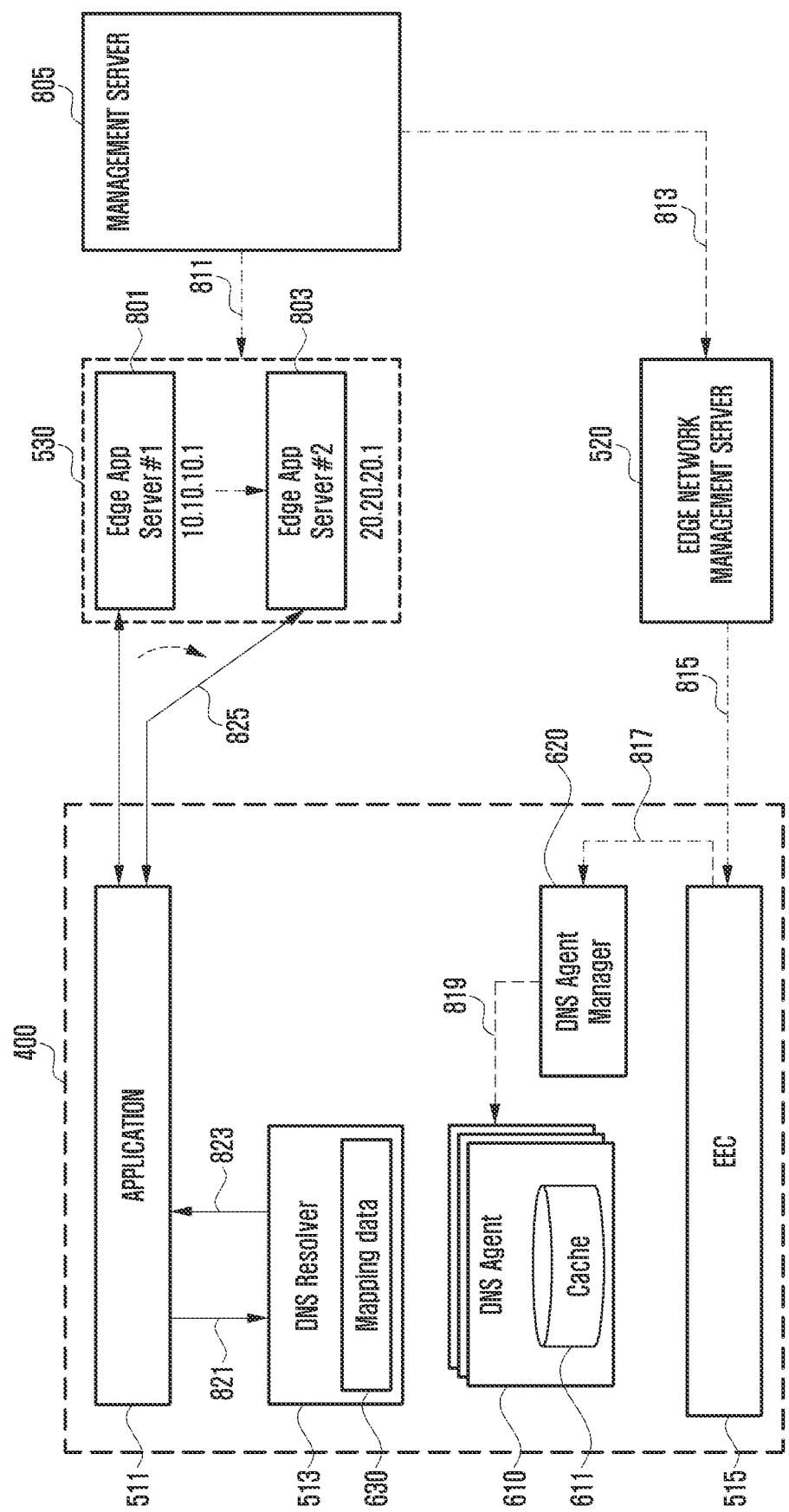
FIG. 8 illustrates an embodiment in which the electronic device acquires a changed IP address according to a change in an IP of an edge service provision server according to an embodiment of the disclosure.

FIG. 8 illustrates an embodiment in which the electronic device acquires a changed IP address according to a change in an IP of an edge service provision server according to an embodiment of the disclosure.

Referring to FIG. 8, according to various embodiments of the disclosure, the electronic device 400 may include a processor 510 (for example, the processor 120 of FIG. 1) and a memory (for example, the memory 130 of FIG. 1). The memory 130 may store various program modules which can be executed in the processor 120. The memory 130 may store at least one application 511 (for example, the application 146 of FIG. 1) allowed to use a service through the edge network, various elements (for example, an edge enabler client (EEC) 515) for supporting edge computing, and/or various elements (for example, the API 512 and the DNS resolver 513) for supporting an IP address which the application 511 can access.

According to various embodiments of the disclosure, the memory 130 may store a plurality of DNS caches 611 allocated to at least some applications (for example, the first application 511) among at least one application (for example, the first application 511 and a second application (not shown)), a DNS agent 610 for managing the DNS caches 611, and/or a DNS agent manager 620 for managing the DNS agent 610.

According to various embodiments of the disclosure, an edge network system (for example, the edge network system 450 of FIG. 4) may include a plurality of edge service provision servers (for example, a first edge service provision server 801 and a second edge service provision server 803). Among the plurality of edge service provision servers, the first edge service provision server 801 and the second edge service provision server 803 which are edge service provision servers providing the same edge service may have the same domain name (edge.samsung.com) and may have different IP addresses.

According to various embodiments of the disclosure, the edge service provision server to be connected to the electronic device 400 may be changed by various causes. For example, in the state in which the electronic device 400 is connected to the first edge service provision server 801, the electronic device 400 may need to be connected to the second edge service provision server 803 by various causes (for example, according to movement of the electronic device 400, connection to the second in the state in which the electronic device 400 is connected to the second edge service provision server 803 may provide a faster edge service than the connection to the first edge service provision server 801. In another example, the electronic device 400 may be connected to the second edge service provision server 803 from the first edge service provision server 801 by a policy of the edge network system 450). In this case, a management server 805 may change the edge service provision server to be connected to the electronic device 400 from the first edge service provision server 801 to the second edge service provision server 803 in operation 811.

According to various embodiments of the disclosure, the management server 805 may transmit information indicating that the edge service provision server to be connected to the electronic device 400 is changed from the first edge service provision server 801 to the second edge service provision server 803 to the edge network management server 520 in operation 813.

According to various embodiments of the disclosure, the edge network management server 520 may transmit access information of the second edge service provision server 803 to be connected to the electronic device 400 to the EEC 515. The EEC 515 may receive access information of the second edge service provision server 803 through the discovery procedure in operation 815.

According to various embodiments of the disclosure, the EEC 515 may identify that the access information of the edge service provision server is changed (for example, the domain address is the same but the IP address is changed) and transmit the changed access information to the DNS agent manager 620 in operation 817. The DNS agent manager 620 may identify the changed access information and select the DNS agent 610 related to the changed access information on the basis of the mapping data. The DNS agent manager 620 may update the DNS cache 611 by adding the changed access information to the DNS cache 611 corresponding to the selected DNS agent 610 in operation 819.

According to various embodiments of the disclosure, the application 511 may transmit a domain name (edge.samsung.com) of the edge service provision server 530 and/or identification information of the application 511 to the DNS resolver 513 in order to perform the edge service in operation 821. Alternatively, the DNS resolver 513 may receive the identification information of the application 511 from an operating system (for example, the operating system 142 of FIG. 3) and receive the domain name of the edge service provision server 530 from the application 511. The DNS resolver 513 may select the DNS agent 610 corresponding to the application 511 from among a plurality of DNS caches on the basis of the mapping data 630 and acquire an IP address (20.20.20.1) of the second edge service provision server 803 on the basis of the DNS cache 611 corresponding to the DNS agent 610 and the domain name (edge.samsung.com) in operation 823. The application 511 may access the second edge service provision server 803 on the basis of the received IP address in operation 825.

An electronic device according to various embodiments of the disclosure includes a memory configured to store a plurality of applications comprising a first application, an edge enabler client (EEC), and a plurality of DNS caches allocated to at least some applications of the plurality of applications, and/or mapping data in which identification information of the at least some applications and the plurality of DNS caches are mapped, a communication circuit used for a communication connection of an edge network management server and/or an edge service provision server through a base station (BS), and a processor, wherein the processor is configured to receive an access request for the edge service provision server which the first application desires to access from the first application, identify whether a DNS cache corresponding to the first application exists in the plurality of DNS caches, based on identification information of the first application and the mapping data, acquire an IP address corresponding to a domain address included in the access request, based on the DNS cache corresponding to the first application in response to the existence of the DNS cache corresponding to the first application in the plurality of DNS caches, and access the edge service provision server, based on the acquired IP address to perform a service.

In the electronic device according to various embodiments, the plurality of DNS caches may be generated for respective applications allowed to use an edge service among the plurality of applications.

In the electronic device according to various embodiments, in the mapping data, applications allowed to use an edge service among the plurality of applications may be mapped to DNS caches corresponding to the applications.

In the electronic device according to various embodiments, the processor may be configured to receive access information of the edge service provisions server received from the edge network management server and determine whether to update the mapping data, based on the access information.

In the electronic device according to various embodiments, the processor may be configured to update a DNS cache corresponding to identification information of an application included in the access information among the plurality of DNS caches, based on the access information.

In the electronic device according to various embodiments, the processor may be configured to compare an IP address stored in the DNS cache corresponding to the first application with an IP address included in the access information, based on the access information and update the IP address stored in the DNS address to the IP address included in the access information, based on whether the IP address included in the access information matches the IP address stored in the DNS cache.

In the electronic device according to various embodiments, the processor may be configured to, in response to deletion, change, or addition of an application stored in the memory, determine whether to update the mapping data and/or a DNS cache corresponding to the deleted, changed, or added application.

In the electronic device according to various embodiments, the processor may be configured to receive an access request for the edge service provision server which a second application desires to access from the second application, which is not allowed to use the edge service and acquire an IP address corresponding to a domain address, which the second application can access, based on a second DNS cache stored in the memory in response to identification that identification information of the second application is not included in the mapping data.

In the electronic device according to various embodiments, the second DNS cache may be a cache which all of the plurality of applications can access.

In the electronic device according to various embodiments, the processor may be configured to identify whether the electronic device moves by a predetermined distance or longer, based on a sensor configured to measure a location of the electronic device and perform at least one operation for updating the DNS cache, based on a result of the identification.

In the electronic device according to various embodiments, the processor may be configured to identify whether location information is included in information related to allowance of access to the edge service provision server in access information of the edge service provision server received from the edge network management server and update the DNS cache, based on a location of the electronic device and the location information.

In the electronic device according to various embodiments, the processor may be configured to update the DNS cache to make access to the edge service provision server impossible in response to identification that the location of the electronic device is an area which is not allowed to access the edge service provision server.

Figure 9:
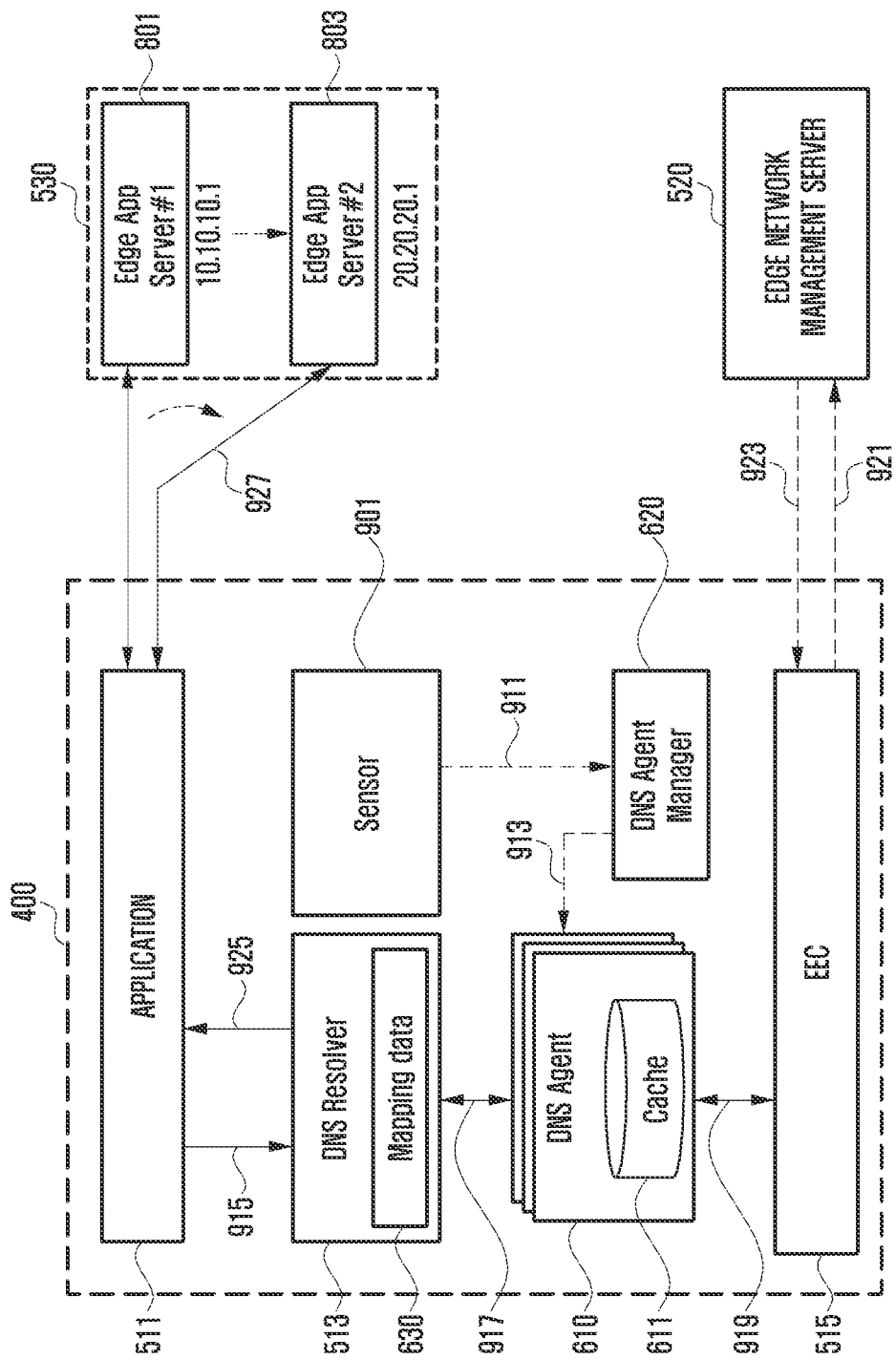
FIG. 9 illustrates an embodiment in which the electronic device updates DNS caches on the basis of the location of the electronic device according to an embodiment of the disclosure.

FIG. 9 illustrates an embodiment in which the electronic device updates DNS caches on the basis of the location of the electronic device according to an embodiment of the disclosure.

Referring to FIG. 9, according to various embodiments of the disclosure, the electronic device 400 may include a processor 510 (for example, the processor 120 of FIG. 1) and a memory (for example, the memory 130 of FIG. 1). The memory 130 may store various program modules which can be executed in the processor 120. The memory 130 may store at least one application 511 (for example, the application 146 of FIG. 1) allowed to use a service through the edge network, various elements (for example, an edge enabler client (EEC) 515) for supporting edge computing, and/or various elements (for example, the API 512 and the DNS resolver 513) for supporting an IP address which the application 511 can access.

According to various embodiments of the disclosure, the memory 130 may store a plurality of DNS caches 611 allocated to at least some applications (for example, the first application 511) among at least one application (for example, the first application 511 and a second application (not shown)), a DNS agent 610 for managing the DNS caches 611, and/or a DNS agent manager 620 for managing the DNS agent 610.

According to various embodiments of the disclosure, an edge network system (for example, the edge network system 450 of FIG. 4) may include a plurality of edge service provision servers (for example, a first edge service provision server 801 and a second edge service provision server 803). Among the plurality of edge service provision servers, the first edge service provision server 801 and the second edge service provision server 803 which are edge service provision servers providing the same edge service may have the same domain name (edge.samsung.com) and may have different IP addresses.

According to various embodiments of the disclosure, the EEC 515 may update the DNS agents 610, the DNS caches 611, and/or the mapping data 630 on the basis of location information of the electronic device 400 transmitted by a sensor 901 (for example, the sensor module 176 of FIG. 1) measuring the location of the electronic device 400. The EEC 515 may receive the location of the electronic device 400 from the sensor 901 according to every predetermined period in operation 911. The EEC 515 may initialize (or flush) the DNS caches 611 in response to the identification that the electronic device 400 moves by a predetermined distance or longer in operation 913.

According to various embodiments of the disclosure, the application 511 may transmit the domain name (edge.samsung.com) of the edge service provision server 530 and the identification information of the application 511 to the DNS resolver 513 in order to perform the edge service in operation 915. The DNS resolver 513 may select the DNS agent 610 or the DNS cache 611 corresponding to the identification of the application 511 on the basis of the mapping data and make a request for an IP address corresponding to the domain name in operation 917. The DNS cache 611 may have been initialized, in which case the DNS cache 611 may not store the IP address.

According to various embodiments of the disclosure, the DNS agent 610 may make a request for access information of the edge service provision server 530 which the application 511 can access to the EEC 515 in operation 919. The EEC 515 may transmit a signal making a request for access information of the edge service provision server 530 to the edge network management server 520 through a discovery procedure in operation 921. When the edge network management server 520 can acquire the location of the electronic device 400, the edge network management server 520 may transmit a discovery response message including the access information of the edge service provision server 803 which can be connected to the electronic device 400 to the EEC 515 in operation 923. The access information of the edge service provision server 803 may include a domain name and an IP address of the edge service provision server 803.

According to various embodiments of the disclosure, the EEC 515 may control the DNS agent manager 620 to update the DNS cache 611 on the basis of the access information of the edge service provision server 803 included in the discovery response message. The DNS agent manager 620 may update the DNS cache 611 by adding the changed access information to the DNS cache 611 corresponding to the selected DNS agent 610.

According to various embodiments of the disclosure, the DNS agent manager 620 may identify changed access information and select the DNS agent 610 related to the changed access information on the basis of mapping data. The DNS agent manager 620 may update the DNS cache 611 by adding the changed access information to the DNS cache 611 corresponding to the selected DNS agent 610.

According to various embodiments of the disclosure, the DNS resolver 513 may transmit the IP address (20.20.20.1) of the second edge service provision server 803 included in the updated DNS cache 611 to the application 511 in operation 925. The application 511 may access the second edge service provision server 803 on the basis of the received IP address in operation 927.

According to various embodiments of the disclosure, the EEC 515 may identify whether allowance information related to the location of the edge service provision server 530 is included in the access information of the edge service provision server 530 received through the discovery procedure. When the electronic device 400 exists at a specific location, the allowance information related to the location of the edge service provision server 530 may be information indicating the right to access the edge service provision server 530. The EEC 515 may identify the location of the electronic device 400 through the sensor 176 and update the DNS cache 611 on the basis of the identified electronic device 400 and the allowance information related to the location of the edge service provision server 530. For example, the EEC 515 may update the DNS cache 611 to make access to the edge service provision server 530 impossible in response to the identification that the location of the electronic device 400 is a location having no right to access the edge service provision server 530. Updating the DNS cache 611 to make access to the edge service provision server 530 impossible may include adding information indicating that access to an IP address (for example, the IP address of the edge service provision server 530) corresponding to a specific domain name (for example, the domain name of the edge service provision server 530) is impossible to the DNS cache 611.

Figure 10:
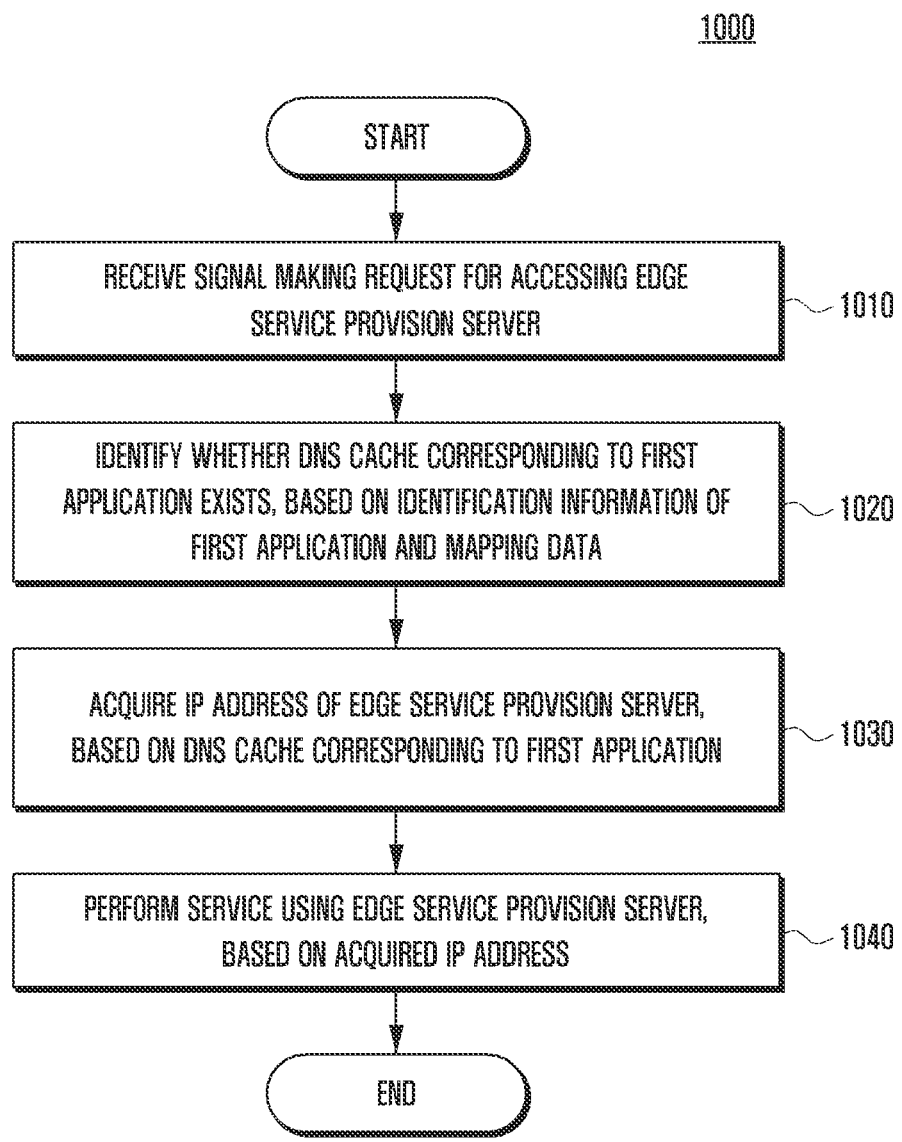
FIG. 10 is a flowchart illustrating a method of operating an electronic device according to an embodiment of the disclosure.

FIG. 10 is a flowchart illustrating a method 1000 of operating an electronic device according to an embodiment of the disclosure.

Referring to FIG. 10, according to various embodiments of the disclosure, in operation 1010, an electronic device (for example, the electronic device 400 of FIG. 4) may receive an access request signal for an edge service provision server (for example, the edge service provision server 530 of FIG. 6) from a first application (for example, the first application 511 of FIG. 6).

According to various embodiments of the disclosure, the access request signal may include a domain address of the edge service provision server 530.

According to various embodiments of the disclosure, in operation 1020, the electronic device 400 may identify whether the DNS cache 611 corresponding to the first application 511 exists on the basis of identification information of the first application and mapping data (for example, the mapping data 630 of FIG. 6).

According to various embodiments of the disclosure, the DNS cache 611 may include the domain address and the IP address of the edge service provision server 530. The DNS cache 611 may be generated and managed on the basis of the number of applications allowed to use the edge service. For example, when N applications allowed to use the edge service are installed in the electronic device 400, the electronic device 400 may generate and mange N DNS caches 611.

According to various embodiments of the disclosure, the mapping data 630 may be data indicating the DNS agents 610 (or the DNS caches 611) allocated to at least one application (for example, the first application 511) among the applications installed in the electronic device 400. The mapping data 630 may be implemented in the form of data obtained by mapping at least one application (for example, the first application 511) allowed to use the edge service among the applications installed in the electronic device 400 and the DNS agents 610 (or the DNS caches 611) corresponding to the at least one application.

According to various embodiments of the disclosure, the mapping data 630 may be data indicating the DNS agent 610 allocated to the application included in access information of the edge service provision server 530 received through a discovery procedure between the EEC 515 and the edge network management server 520. The mapping data 630 may be implemented in the form of data obtained by mapping the application included in the access information of the edge service provision server 530 and DNS agents 610 (or DNS caches 611) corresponding to at least one application.

The electronic device 400 may identify whether the DNS cache 611 from which the IP address is acquired exists on the basis of mapping data and identification information of the first application 511.

According to various embodiments of the disclosure, in operation 1030, the electronic device 400 may acquire the IP address of the edge service provision server 530 on the basis of the DNS cache 611 corresponding to the first application 511 in response to the identification that the DNS cache 611 corresponding to the application 511 exists.

According to various embodiments of the disclosure, in operation 1040, the electronic device 400 may use the edge service using the edge service provision server 530 on the basis of the acquired IP address.

Figure 11:
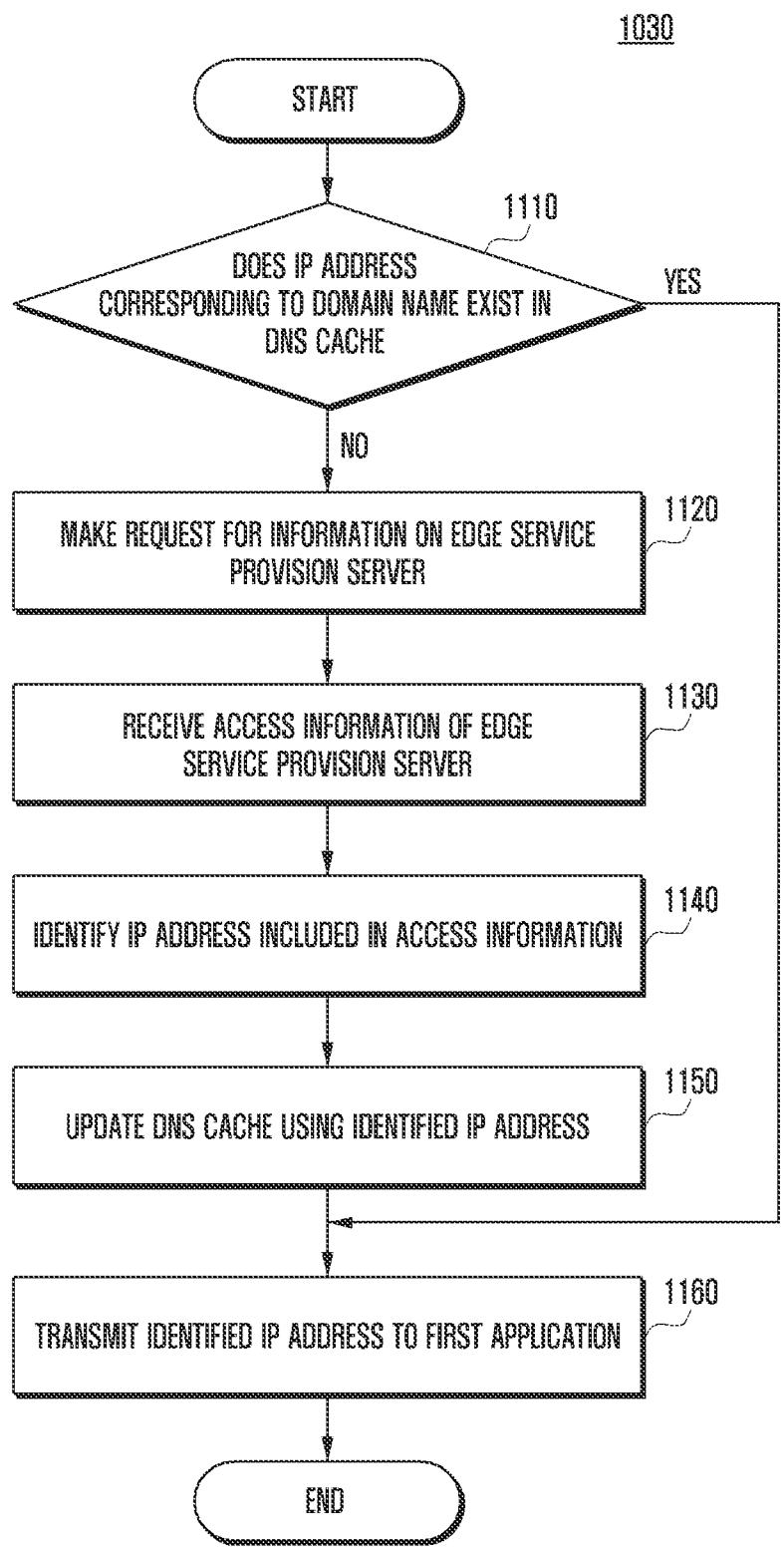
FIG. 11 illustrates an embodiment of updating a DNS cache on the basis of information received from an edge network management server in the method of operating the electronic device according to an embodiment of the disclosure.

FIG. 11 illustrates operation 1030 of acquiring the IP address using the DNS cache in the method of operating the electronic device according to an embodiment of the disclosure.

Referring to FIG. 11, according to various embodiments of the disclosure, in operation 1110, the electronic device 400 may identify whether an IP address corresponding to the domain name transmitted by the application 511 exists in the DNS cache 611.

The electronic device 400 may transmit the identified IP address to the first application 511 in response to the identification (operation 1110-Y) that the IP address corresponding to the domain name transmitted by the application 511 exists in the DNS cache 611 in operation 1160 and perform the edge service using the edge service provision server 530 on the basis of the acquired IP address.

According to various embodiments of the disclosure, in operation 1120, the electronic device 400 may make a request for access information of the edge service provision server 530 to the edge network management server 520 in response to the identification (operation 1110-N) that the IP address corresponding to the domain name transmitted by the application 511 does not exist in the DNS cache 611.

According to various embodiments of the disclosure, the electronic device 400 may transmit a request signal of the access information of the edge service provision server 530 to the edge network management server 520 through a discovery procedure with the edge network management server 520.

According to various embodiments of the disclosure, in operation 1130, the electronic device 400 may receive the access information of the edge service provision server 530 from the edge network management server 520.

The access information of the edge service provision server 530 may include identification information of the edge service provision server 530, identification information of an application provided by the edge service provision server 530, a domain address of the edge service provision server 530, and/or an IP address of the edge service provision server 530. The access information of the edge service provision server 530 may be included in a discovery response message.

According to various embodiments of the disclosure, in operation 1140, the electronic device 400 may identify the IP address included in the access information of the edge service provision server 530.

According to various embodiments of the disclosure, in operation 1150, the electronic device 400 may update the DNS cache 611 by using the acquired IP address.

According to various embodiments of the disclosure, the electronic device 400 may select the DNS cache 611 to be updated on the basis of the identification information of the application included in the access information of the edge service provision server 530. The electronic device 400 may update the DNS cache 611 by adding the domain address and the IP address to the selected DNS cache 611.

According to various embodiments of the disclosure, in operation 1160, the electronic device 400 may transmit the IP address corresponding to the domain address transmitted by the first application 511 to the first application 511 by using the updated DNS cache 611.

According to various embodiments of the disclosure, the electronic device 400 may perform the edge service through the edge service provision server 530 on the basis of the acquired IP address.

A method of operating an electronic device according to various embodiments of the disclosure may include an operation of receiving an access request for an edge service provision server, which a first application allowed to use an edge service desires to access, from the first application, an operation of identifying whether a DNS cache corresponding to the first application exists in a plurality of DNS caches, based on mapping data, in which each of identification information of applications matches the plurality of DNS caches, and identification information of the first application, an operation of acquiring an IP address corresponding to a domain address included in the access request, based on the DNS cache corresponding to the first application in response to the existence of the DNS cache corresponding to the first application in the plurality of DNS caches, and an operation of accessing the edge service provision server, based on the acquired IP address to perform a service.

In the method of operation the electronic device according to various embodiments of the disclosure, the plurality of DNS caches may be allocated to at least some applications of the plurality of applications, and the at least some applications may be applications allowed to use the edge service.

The method of operation the electronic device according to various embodiments of the disclosure may further include an operation of receiving access information of the edge service provision server received from the edge network management server and an operation of determining whether to update the mapping data, based on the access information.

The method of operation the electronic device according to various embodiments of the disclosure may further include an operation of updating a DNS cache corresponding to identification information of an application included in the access information among the plurality of DNS caches, based on the access information.

In the method of operation the electronic device according to various embodiments of the disclosure, the operation of updating the DNS cache may further include an operation of comparing an IP address stored in the DNS cache corresponding to the first application with an IP address included in the access information, based on the access information and an operation of updating the IP address stored in the DNS address to the IP address included in the access information, based on whether the IP address included in the access information matches the IP address stored in the DNS cache.

The method of operation the electronic device according to various embodiments of the disclosure may further include an operation of receiving an access request for the edge service provision server which a second application desires to access from the second application, which is not allowed to use the edge service and an operation of acquiring an IP address corresponding to a domain address, which the second application can access, based on a second DNS cache stored in the memory in response to identification that identification information of the second application is not included in the mapping data.

The method of operation the electronic device according to various embodiments of the disclosure may further include an operation of identifying whether the electronic device moves by a predetermined distance or longer, based on a sensor configured to measure a location of the electronic device and an operation of performing at least one operation for updating the DNS cache, based on a result of the identification.

The method of operation the electronic device according to various embodiments of the disclosure may further include an operation of identifying whether location information is included in information related to allowance of access to the edge service provision server in access information of the edge service provision server received from the edge network management server and an operation of updating the DNS cache, based on a location of the electronic device and the location information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a memory configured to store a plurality of applications comprising a first application, an edge enabler client (EEC), and a plurality of domain name system (DNS) caches allocated to at least some applications of the plurality of applications, and/or mapping data in which identification information of the at least some applications and the plurality of DNS caches are mapped:
    a communication circuit used for a communication connection of an edge network management server and/or an edge service provision server through a base station (BS); and
    a processor configured to:
        receive, from the first application, an access request for the edge service provision server that the first application desires to access,
        identify whether a DNS cache corresponding to the first application exists in the plurality of DNS caches, based on identification information of the first application and the mapping data,
        acquire an internet protocol (IP) address corresponding to a domain address included in the access request, in case that the DNS cache corresponding to the first application exists in the plurality of DNS caches, and
        access the edge service provision server, based on the acquired IP address to perform a service.

2. The electronic device of claim 1, wherein the plurality of DNS caches are generated for respective applications allowed to use an edge service among the plurality of applications.

3. The electronic device of claim 1, wherein, in the mapping data, applications allowed to use an edge service among the plurality of applications are mapped to DNS caches corresponding to the applications.

4. The electronic device of claim 1, wherein the processor is configured to:
    receive access information of the edge service provisions server received from the edge network management server; and
    determine whether to update the mapping data, based on the access information.

5. The electronic device of claim 4, wherein the processor is further configured to update a DNS cache corresponding to identification information of an application included in the access information among the plurality of DNS caches, based on the access information.

6. The electronic device of claim 5, wherein the processor is further configured to:
    compare an IP address stored in the DNS cache corresponding to the first application with an IP address included in the access information, based on the access information; and
    update the IP address stored in the DNS cache to the IP address included in the access information, based on whether the IP address included in the access information matches the IP address stored in the DNS cache.

7. The electronic device of claim 1, wherein, in response to a deletion, a change, or an addition of an application stored in the memory, the processor is further configured to determine whether to update the mapping data and/or a DNS cache corresponding to the deleted, changed, or added application.

8. The electronic device of claim 1, wherein the processor is further configured to:
receive, from a second application not allowed to use an edge service, an access request for the edge service provision server that the second application desires to access; and
acquire an IP address corresponding to a domain address, which is accessible to the second application, based on a second DNS cache stored in the memory in response to identification that identification information of the second application is not included in the mapping data.

9. The electronic device of claim 8, wherein the second DNS cache is accessible to all of the plurality of applications.

10. The electronic device of claim 1, wherein the processor is further configured to:
identify whether the electronic device moves by a predetermined distance or longer, based on a sensor configured to measure a location of the electronic device; and
perform at least one operation for updating the DNS cache, based on a result of the identification.

11. The electronic device of claim 1, wherein the processor is further configured to:
identify whether location information is included in information related to allowance of access to the edge service provision server in access information of the edge service provision server received from the edge network management server; and
update the DNS cache, based on a location of the electronic device and the location information.

12. The electronic device of claim 11, wherein the processor is further configured to update the DNS cache to make the edge service provision server inaccessible in response to identification that the location of the electronic device is an area which is not allowed to access the edge service provision server.

13. The electronic device of claim 12, wherein the update to the DNS cache includes adding information indicating that an IP address of the edge service provision server corresponding to a specific domain name is inaccessible.

14. The electronic device of claim 12, wherein the access information of the edge service provision server indicates a right to access the edge service provision server is received through a discovery process.

15. A method of operating an electronic device, the method comprising:
receiving, from a first application allowed to use an edge service, an access request for an edge service provision server that the first application desires to access:
identifying whether a domain name system (DNS) cache corresponding to the first application exists in a plurality of DNS caches, based on mapping data, in which each of identification information of applications matches the plurality of DNS caches, and identification information of the first application:
acquiring an internet protocol (IP) address corresponding to a domain address included in the access request, in case that the DNS cache corresponding to the first application exists in the plurality of DNS caches; and
accessing the edge service provision server, based on the acquired IP address to perform a service.

16. The method of claim 15,
wherein the plurality of DNS caches are allocated to at least some applications of a plurality of applications installed in a memory, and
wherein the at least some applications are applications allowed to use the edge service.

17. The method of claim 15, further comprising:
receiving access information of the edge service provision server received from an edge network management server; and
determining whether to update the mapping data, based on the access information.

18. The method of claim 17, wherein the access information of the edge service provision server indicates a right to access the edge service provision server is received through a discovery process.

19. The method of claim 18, further comprising:
identifying whether a location of the electronic device is in an area in which an access to the edge service provision server is not allowed to, and
updating the DNS cache based on the identified location of the electronic device and the access information of the edge service provision server.

20. The method of claim 19, wherein the updating of the DNS cache comprises adding information indicating that an IP address of the edge service provision server corresponding to a specific domain name is inaccessible.

* * * * *